(12) United States Patent
Kazmi et al.

(10) Patent No.: US 9,525,527 B2
(45) Date of Patent: Dec. 20, 2016

(54) WIRELESS DEVICE PERFORMANCE IN HETEROGENEOUS NETWORKS

(75) Inventors: Muhammad Kazmi, Bromma (SE); Bengt Lindoff, Bjärred (SE); Iana Siomina, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 241 days.

(21) Appl. No.: 14/126,627

(22) PCT Filed: Jun. 15, 2012

(86) PCT No.: PCT/SE2012/050663
§ 371 (c)(1),
(2), (4) Date: Dec. 16, 2013

(87) PCT Pub. No.: WO2012/173568
PCT Pub. Date: Dec. 20, 2012

(65) Prior Publication Data
US 2014/0119334 A1 May 1, 2014

Related U.S. Application Data

(60) Provisional application No. 61/498,228, filed on Jun. 17, 2011.

(51) Int. Cl.
*H04L 5/00* (2006.01)
*H04W 24/10* (2009.01)
(Continued)

(52) U.S. Cl.
CPC ............ *H04L 5/0032* (2013.01); *H04W 24/02* (2013.01); *H04W 24/10* (2013.01); *H04W 72/08* (2013.01); *H04W 72/1226* (2013.01)

(58) Field of Classification Search
None
See application file for complete search history.

(56) References Cited

U.S. PATENT DOCUMENTS

2012/0113843 A1* 5/2012 Watfa ................ H04W 72/1289
370/252

FOREIGN PATENT DOCUMENTS

WO 2012173561 A2 12/2012

OTHER PUBLICATIONS

Author Unknown, "Measurement Resource Restriction Patters for Inter-Frequency Measurement in eICIC," CMCC; 3GPP TSG-RAN WG2 Meeting #72bis; R2-110394; Jan. 17-21, 2011. pp. 1-6. Dublin, Ireland.

(Continued)

*Primary Examiner* — Mohammad Adhami
(74) *Attorney, Agent, or Firm* — Murphy, Bilak & Homiller, PLLC

(57) ABSTRACT

The present invention relates to a method in a wireless device for improving wireless device performance, and to corresponding methods in a radio network node and to the corresponding nodes. The method comprises identifying (910) an occasion comprising a time period during which at least one time-frequency resource element, in a subframe that is transmitted between the wireless device and the radio network node, does not comprise information intended for the wireless device, or is not a time-frequency resource element in which the wireless device is expected to transmit. The method further comprises performing (920) an auxiliary action during the identified occasion to improve the wireless device performance.

11 Claims, 11 Drawing Sheets

(51) Int. Cl.
  *H04W 24/02* (2009.01)
  *H04W 72/08* (2009.01)
  *H04W 72/12* (2009.01)

(56) References Cited

OTHER PUBLICATIONS

3rd Generation Partnership Project, "3GPP TS 36.300 V10.3.0 (Mar. 2011)," 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10). Mar. 2011. pp. 1-197.

Author Unknown, "LS on time-domain extension of Rel 8/9 backhaul-based ICIC for Macro-Pico scenario," RAN1. 3GPP TSG RAN WG2 Meeting #71 bis; R2-105991; Oct. 11-15, 2010. pp. 1-2. Xian, China.

Author Unknown, "eICIC: Idle Mode considerations," Qualcomm Incorporated; 3GPP TSG-RAN WG2 Meeting #71bis; R2-105786. Oct. 11-15, 2010. pp. 1-2. Xi'an, China.

Author Unknown, "RRC Impact of eICIC," Nokia Siemens Networks, Nokia Corporation. 2GPP TSG-RAN WG2 Meeting #71bis; R2-105467; Oct. 11-15, 2010. Xi'an, China.

3rd Generation Partnership Porject, "3GPP TR 36.805 v9.0.0 (Dec. 2012)," 3rd Generation Partnership Project; Technical Specification Group Radio Access Network; Study on Minimization of drive-tests in Next Generation Networks; (Release 9). Dec. 2009. pp. 1-24.

3rd Generation Partnership Project, "3GPP TS 37.320 V10.1.0 (Mar. 2011)," 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10). Mar. 2011. pp. 1-17.

Author Unknown, "ETSI TS 136 300 V10.3.0 (Apr. 2011)," LTE; Evolved Universal Terrestrial Radio Access (E-UTRA) and Evolved Universal Terrestrial Radio Access Network (E-UTRAN); Overall description; Stage 2 (3GPP TS 36.300 version 10.0.0 Release 10). Apr. 2011. pp. 1-204.

Author Unknown, "Discussions on Random Access for HetNet mobility," Pantech; 3GPP TSG RAN Working Group 2 Meeting #74; R2-112910. May 9-13, 2011. pp. 1-2. Barcelona, Spain.

3RD Generation Partnership Project, "3GPP TS 36.423 V10.1.0 (Mar. 2011)," 3rd Generation Partnership Project; Technical Specification Group Radio Access Network; Evolved Universal Terrestrial Radio Access Network (E-UTRAN); X2 application protocol (X2AP) (Release 10). Mar. 2011. pp. 1-132.

3rd Generation Partnership Project, "3GP PTS 36.331 V10.1.0 (Mar. 2011)," 3rd Generation Partnership Project; Technical Specification Group Radio Access Network; Evolved Universal Terrestrial Radio Access (E-UTRA); Radio Resource Control (RRC); Protocol specification (Release 10). Mar. 2011. pp. 1-290.

* cited by examiner

WIRELESS DEVICE PERFORMANCE IN HETEROGENEOUS NETWORKS

TECHNICAL FIELD

The disclosure relates generally to a radio communication network applying restricted measurement patterns and/or low-interference subframe patterns for inter-cell interference coordination. The disclosure relates in particular to a method in a wireless device connected to a radio network node of such a radio communication network, for improving performance of the wireless device. The disclosure also relates to a method in the radio network node and to a wireless device and a radio network node.

BACKGROUND

Radio communication networks were originally developed primarily to provide voice services over circuit-switched networks. The introduction of packet-switched bearers in, for example, the so-called 2.5 and third generation networks (2.5G and 3G) enabled network operators to provide data services as well as voice services. Eventually, network architectures will likely evolve toward all Internet Protocol (IP) networks which provide both voice and data services. However, network operators have a substantial investment in existing infrastructures and would, therefore, typically prefer to migrate gradually to all IP network architectures in order to allow them to extract sufficient value from their investment in existing infrastructures. Also to provide the capabilities needed to support next generation radio communication applications, while at the same time using legacy infrastructure, network operators could deploy hybrid networks wherein a next generation radio communication system is overlaid onto an existing circuit-switched or packet-switched network as a first step in the transition to an all IP-based network. Alternatively, a radio communication system can evolve from one generation to the next while still providing backward compatibility for legacy equipment.

One example of such an evolved network is based upon the Universal Mobile Telecommunication System (UMTS) which is an existing third generation (3G) radio communication system that is evolving into High Speed Packet Access (HSPA) technology. Yet another alternative is the introduction of a new air interface technology within the UMTS framework, e.g., the so-called Long Term Evolution (LTE) technology. Target performance goals for LTE systems include, for example, support for 200 active calls per 5 MHz cell and sub 5 ms latency for small IP packets. Each new generation, or partial generation, of mobile communication systems add complexity and abilities to mobile communication systems and this can be expected to continue with either enhancements to proposed systems or completely new systems in the future.

3GPP LTE is a fourth-generation mobile communication technologies standard developed within the $3^{rd}$ Generation Partnership Project (3GPP). The Universal Terrestrial Radio Access (UTRA) Network (UTRAN) is the radio access network of a UMTS and Evolved UTRAN (E-UTRAN) is the radio access network of an LTE system. In an UTRAN and an E-UTRAN, a User Equipment (UE) 150, or any wireless device, is wirelessly connected to a Radio Base Station (RBS) 110a commonly referred to as a NodeB (NB) in UMTS, and as an evolved NodeB (eNodeB or eNB) in LTE, as illustrated in FIG. 1. An RBS is a general term for a radio network node capable of transmitting radio signals to a UE and receiving signals transmitted by a UE. In E-UTRAN, the eNodeBs 110a-c are directly connected to the core network (CN) 190. The eNodeBs 101a-c are also connected to each other via an X2 interface.

LTE uses Orthogonal Frequency Division Multiplexing (OFDM) in the downlink and Discrete Fourier Transform (DFT)-spread OFDM in the uplink. The basic LTE downlink physical resource can thus be seen as a time-frequency grid as illustrated in FIG. 2a, where each resource element 210 corresponds to one OFDM subcarrier 220 during one OFDM symbol interval 230. In the time domain, LTE downlink transmissions are organized into radio frames 270 of 10 ms, each radio frame consisting of ten equally-sized subframes 250 of length Tsubframe=1 ms as shown in FIG. 2b. Furthermore, the resource allocation in LTE is typically described in terms of resource blocks, also called Physical Resource Blocks (PRB), where a resource block corresponds to one slot 260 of 0.5 ms in the time domain and twelve contiguous subcarriers 220 in the frequency domain. Resource blocks are numbered in the frequency domain, starting with 0 from one end of the system bandwidth. Downlink transmissions are dynamically scheduled, i.e., in each subframe the eNodeB transmits control information indicating to which terminals and on which resource blocks the data is transmitted during the current downlink subframe. This control signaling is typically transmitted in the first one, two, three or four OFDM symbols in each subframe.

The interest in deploying low-power nodes, such as pico base stations, home eNodeBs, relays, or remote radio heads, for enhancing the macro network performance in terms of the network coverage, capacity and service experience of individual users has been constantly increasing over the last few years. At the same time, there has been realized a need for enhanced interference management techniques to address the arising interference issues caused, for example, by a significant transmit power variation among different cells and cell association techniques developed earlier for more uniform networks.

In 3GPP, heterogeneous network deployments have been defined as deployments where low-power nodes of different transmit powers are placed throughout a macro-cell layout, implying also non-uniform traffic distribution. Such deployments are, for example, effective for capacity extension in certain areas, so-called traffic hotspots, i.e. small geographical areas with a higher user density and/or higher traffic intensity where installation of pico nodes can be considered to enhance performance. Heterogeneous deployments may also be viewed as a way of increasing the density of networks to adapt for the traffic needs and the environment. However, heterogeneous deployments also bring challenges for which the network has to be prepared to ensure efficient network operation and superior user experience. Some challenges are related to the increased interference in the attempt to increase small cells associated with low-power nodes, also known as cell range expansion.

Cell Range Expansion

The need for enhanced Inter-Cell Interference Coordination (ICIC) techniques is particularly crucial when the cell assignment rule diverges from the Reference Signal Received Power (RSRP)-based approach. This is e.g. the case when a path loss- or a path gain-based approach is used. This approach is sometimes also referred to as the cell range expansion, when it is adopted for cells with a transmit power lower than neighbour cells. The idea of the cell range expansion is illustrated in FIG. 3, where the cell range expansion of a pico cell served by a pico BS 110b is implemented by means of a delta-parameter $\Delta$. The expanded cell range of the pico BS 110*b* corresponds to the outermost cell edge 120*b*, while the conventional RSRP-based cell range of pico BS 110*b* corresponds to the innermost cell edge 120*a*. The pico cell is expanded without increasing its power, just by changing the reselection threshold. In one example, the UE 150 chooses the cell of pico BS 110*b* as the serving cell when RSRPb+Δ≥RSRPa, where RSRPa is the signal strength measured for the cell of macro BS 110*a* and RSRPb is the signal strength measured for the cell of pico BS 110*b*. The striped line 130*a* illustrates RSRPa from the macro BS 110*a*, the dotted line 130*b* illustrates RSRPb from the pico BS 110*b* corresponding to the cell range 120*a*, and the solid line 130*c* illustrates the received signal strength from the pico BS 110*b* with the delta parameter added. This results in a change from the conventional cell range 120*a* to an expanded cell range 120*b* when Δ>0. Such cell range expansion is of interest in heterogeneous networks, since the coverage of e.g. pico cells may otherwise be too small and the radio resources of these nodes may be underutilized. However, as a result a UE may not always be connected to the strongest cell when it is in the neighborhood of a pico cell. The UE may thus receive a stronger signal from the interfering cell compared to the signal received from the serving cell. This results in a poor signal quality in downlink when the UE is receiving data at the same time as the interfering base station is transmitting.

Interference Management for Heterogeneous Deployments

To ensure reliable and high-bit rate transmissions, as well as robust control channel performance, good signal quality must be maintained in wireless networks. The signal quality is typically determined by the received signal strength and its relation to the total interference and noise received by the receiver. A good network plan, which among other factors also includes cell planning, is a prerequisite for the successful network operation. However, a network plan is static. For more efficient radio resource utilization, the network plan has to be complemented at least by semi-static and dynamic radio resource management mechanisms, which are also intended to facilitate interference management, and deployment of advanced antenna technologies and algorithms.

One way to handle interference is, for example, to adopt more advanced transceiver technologies, e.g. by implementing interference cancellation mechanisms in terminals. Another way, which can be complementary to the former, is to design efficient interference coordination algorithms and transmission schemes in the network.

Some ICIC methods for coordinating data transmissions between cells have been specified in LTE release 8, where the exchange of ICIC information between cells in LTE is carried out via the X2 interface by means of the X2-AP protocol. Based on this information, the network can dynamically coordinate data transmissions in different cells in the time-frequency domain and also by means of power control so that the negative impact of inter-cell interference is minimized. With such coordination, base stations may optimize their resource allocation by cells either autonomously or via another network node ensuring centralized or semi-centralized resource coordination in the network. With the current 3GPP specification, such coordination is typically transparent to wireless devices. Two examples of coordinating interference on data channels are illustrated in FIGS. 4*a-b*. The figures illustrate a frame structure for three subframes, carrying the periodically occurring Cell specific Reference Signals (CRS) 420, and with a control channel region 410 in the beginning of each subframe, followed by a data channel region 430. The control and data channel regions are white when not carrying any data and filled with a structure otherwise. In the first example illustrated in FIG. 4*a*, data transmissions in two cells belonging to different layers are separated in frequency. The two layers may e.g. be a macro and a pico layer respectively. In the second example illustrated in FIG. 4*b*, low-interference conditions are created at some time instances for data transmissions in pico cells. This is done by suppressing macro-cell transmissions in these time instances, i.e. in so called low-interference subframes 440, in order to enhance performance of UEs which would otherwise experience strong interference from macro cells. One example is when UEs are connected to a pico cell but are still located close to macro cells. Such coordination mechanisms are possible by means of coordinated scheduling, which allows for dynamic interference coordination. There is e.g. no need to statically reserve a part of the bandwidth for highly interfering transmissions.

In contrast to user data, ICIC possibilities for control channels and reference signals are more limited. The mechanisms illustrated in FIGS. 4*a-b* are e.g. not beneficial for control channels. Three known approaches of enhanced ICIC (e-ICIC) to handle the interference on control channels are illustrated in FIGS. 5*a-c*. The approaches illustrated in FIGS. 5*a* and 5*c* require standardization changes while the approach illustrated in FIG. 5*b* is possible with the current standard although it has some limitations for Time Division Duplex (TDD) systems, is not possible with synchronous network deployments, and is not efficient at high traffic loads. In FIG. 5*a*, low-interference subframes 540 are used in which the control channels 550 are transmitted with reduced power for the channels. In FIG. 5*b*, time shifts are used between the cells, and in FIG. 5*c* in-band control channels 560 are used in combination with a control of the frequency reuse.

The basic idea behind interference coordination techniques as illustrated in FIGS. 4*a-b* and FIGS. 5*a-c* is that the interference from a strong interferer, such as a macro cell, is suppressed during another cell's—e.g. a pico cell's—transmissions. It is assumed that the pico cell is aware of the time-frequency resources with low-interference conditions and thus can prioritize scheduling in those subframes of the transmissions for users which are likely to suffer most from the interference caused by the strong interferers. The possibility of configuring low-interference subframes, also known as Almost Blank subframes (ABS), in radio nodes and exchanging this information among nodes, as well as time-domain restricted measurement patterns restricting UE measurements to a certain subset of subframes signaled to the UE, have recently been introduced in the 3GPP standard (TS 36.423 v10.1.0, section 9.2.54, and 3GPP TS 36.331 v10.1.0, section 6.3.6, respectively). An eNodeB may thus transmit ABS which are subframes with reduced power and/or reduced activity on some physical channels, in order to allow the UE to perform measurements under low-interference conditions.

With the approaches illustrated in FIGS. 4*a-b* and FIGS. 5*a-c*, there may still be a significant residual interference on certain time-frequency resources, e.g., from signals whose transmissions cannot be suppressed, such as CRS or synchronization signals. Some known techniques to reduce interference are:

Signal cancellation, by which the channel is measured and used to restore the signal from a limited number of the strongest interferers. This has impacts on the receiver implementation and its complexity. In practice, channel estimation puts a limit on how much of the signal energy that can be subtracted.

Symbol-level time shifting. This technique has no impact on the standard, but is not relevant e.g. for TDD networks and networks providing the Multimedia Broadcast Multicast Service (MBMS) service. This is also only a partial solution to the problem since it allows to distribute interference and avoid it on certain time-frequency resources, but not to eliminate it.

Complete signal muting in a subframe. It could e.g. be not to transmit CRS and possibly also other signals in some subframes. This technique is non-backward compatible to Rel. 8/9 UEs which expect CRS to be transmitted, at least on antenna port 0 in every subframe, even though it is not mandated that the UE performs measurements on those signals every subframe.

Using MBSFN subframes with no MBMS transmissions, which will hereinafter be referred to as blank MBSFN subframes, is a backwards compatible approach that achieves the effect similar to that with complete signal muting, since no signals, not even CRS, are transmitted in the data region of a blank MBSFN subframe. Although CRS are still transmitted in the first symbol of the first slot of a blank MBSFN, using blank MBSFN subframes to avoid potential interference from strongly interfering cells may still be an attractive approach for at least some network deployments.

Restricted Measurement Pattern Configuration Used for Enhanced Inter-Cell Interference Coordination (eICIC)

To facilitate measurements in an expanded cell range, i.e., where high interference is expected, the standard specifies ABS patterns for eNodeBs, as described above, as well as restricted measurement patterns for UEs. An ABS pattern is a transmission pattern at the radio base station which is cell-specific. The ABS pattern may be different from the restricted measurement patterns signaled to the UE.

To enable restricted measurements for Radio Resource Management (RRM), Radio Link Management (RLM), Channel State Information (CSI), as well as for demodulation, the UE may receive the following set of patterns via Radio Resource Control (RRC) UE-specific signaling. The set of patterns are described in TS 36.331 v10.1.0, sections 6.3.2, 6.3.5, and 6.3.6:

Pattern 1: A single RRM/RLM measurement resource restriction pattern for the serving cell.

Pattern 2: One RRM measurement resource restriction pattern per frequency for neighbour cells (up to 32 cells). The RRM measurement is currently only defined for the serving frequency.

Pattern 3: A resource restriction pattern for CSI measurement of the serving cell with two subframe subsets configured per UE.

The pattern is a bit string indicating restricted subframes, where the pattern is defined by a length and a periodicity. The restricted subframes are the subframes indicated by a measurement resource restriction pattern in which the UE is allowed or recommended to perform measurements. The length and periodicity of the patterns are different for Frequency Division Duplex (FDD) and TDD (40 subframes for FDD and 20, 60 or 70 subframes for TDD).

Restricted measurement subframes are configured to allow the UE to perform measurements in subframes with improved interference conditions. Improved interference conditions may e.g. be implemented by configuring ABS patterns at interfering radio nodes such as macro eNodeBs. A pattern indicating such subframes with improved interference conditions may then be signaled to the UE in order for the UE to know when it may measure a signal under improved interference conditions. The pattern may be interchangeably called a restricted measurement pattern, a measurement resource restriction pattern, or a time domain measurement resource restriction pattern. As explained above, an ABS is a subframe with reduced transmit power or activity. In one example, an MBSFN subframe may be an ABS, although it does not have to be an ABS and the MBSFN subframe may even be used for purposes other than interference coordination in the heterogeneous network. ABS patterns may be exchanged between eNodeBs, e.g., via X2, but these eNodeB transmit patterns are not signaled to the UE. However, an MBSFN configuration is signaled to the UE. Signaling independent of the eICIC patterns is used for configuring MBSFN subframes in the UE, via System Information Block (SIB) Type 2 (SIB2).

In a general case, Physical Downlink Shared Channel (PDSCH) transmissions are allowed in ABS subframes, but it is left up to the network implementation how interference is coordinated across the network in these subframes. UEs in Rel-8/9 transmission mode cannot receive PDSCH in MBSFN subframes. This may be exploited e.g. for energy saving. Rel-10 UEs will support PDSCH transmissions in MBSFN subframes, but only UEs in specific transmission modes—transmission mode 9 (TM 9)—will be able to receive DownLink (DL) assignments in signaled MBSFN subframes. These UEs will have to monitor Physical Downlink Control Channel (PDCCH) to check whether there is a DL assignment on a DL Shared Channel (SCH) for this UE. These UEs are also capable of receiving demodulation reference signals for channel estimation, and the need for CRS can thus be avoided.

Random Access

Another aspect of interest for this discussion involves Random Access Channel (RACH) transmissions in E-UTRAN. The Random Access (RA) procedure in LTE is performed to enable the UE to gain uplink access under the following scenarios (see e.g. 3GPP TS 36.300 V10.3.0 (2011-03) section 10.1.5):

During an initial access in idle mode;

For RRC connection re-establishment, e.g. after a radio link failure, or a handover failure;

After the UE has lost uplink synchronization;

Due to data arrival when UE in connected mode does not retain UpLink (UL) synchronization e.g. due to long Discontinuous Reception (DRX);

During HandOver (HO);

RA may also be used to facilitate positioning measurements, e.g. for performing eNodeB Rx-Tx time difference measurement which in turn is used for deriving a timing advance value.

There are various types of RA procedures. The RA procedure can be either contention based or non-contention based. The contention based RA is used during initial access, for RRC connection re-establishment, to regain uplink synchronization and for data transmission when there is no uplink synchronization. On the other hand the non-contention based RA is used during HO and for positioning measurements. Both contention and non-contention RA mechanisms comprise of multi-step procedures.

In contention based RA the UE randomly selects the RA preamble during the RACH opportunity to the eNodeB. During the second step the network responds to the UE with at least a RA preamble identifier, and an initial uplink grant in the RA Response (RAR) message. During the third step the UE uses the initial uplink grant or allocation received in RAR to transmit further details related to the connection request in a message also known as a message 3 (msg3). In message 3 the UE also sends its identifier, which is echoed by the eNodeB in the contention resolution message during the fourth and final step. The contention resolution is considered successful if the UE detects its own identity in the contention resolution message.

In non-contention based RA the eNodeB first assigns a RA preamble. During the second step the UE sends the assigned preamble during the RACH opportunity to the eNodeB. During the third step the network responds to the UE with at least a RA preamble identifier, and an initial uplink grant in the RAR message. The UE uses the initial allocation received in RAR to transmit further details related to for example HO. In case of non-contention based RA there is no contention resolution phase.

Measurements in Radio Communication Systems

Yet another aspect of interest for this discussion involves measurements which are performed in radio communication systems. In LTE the measurements are done for various purposes, such as for mobility, also known as RRM measurements, for positioning, for Self-Organizing Networks (SON), and for Minimization of Drive Tests (MDT). The well-known intra-LTE mobility measurements, which may be both intra-, and inter-frequency, are: RSRP and Reference Signal Received Quality (RSRQ). The well-known inter-RAT mobility measurements are:

UTRAN Common Pilot Channel (CPICH) Received Signal Code Power (RSCP)
UTRA carrier Received Signal Strength Indicator (RSSI)
UTRAN CPICH Ec/No, where CPICH Ec/No=CPICH RSCP/carrier RSSI
GSM carrier RSSI
CDMA2000 Pilot Strength
High Rate Packet Data (HRPD) Pilot Strength.

In terms of positioning measurements, the following positioning measurements are possible since Rel-9 with enhanced cell ID and Observed Time Difference Of Arrival (OTDOA) positioning methods:

UE Rx-Tx time difference measurement
eNodeB Rx-Tx time difference measurement
Timing advance (TA) measurement
Angle of Arrival (AoA) measurements
Reference signal time difference (RSTD) for OTDOA
RSRP and RSRQ.

The MDT feature has been introduced in LTE and HSPA Rel-10. The MDT feature provides means for reducing the effort for operators when gathering information for the purpose of network planning and optimization. The MDT feature requires that the UEs log or obtain various types of measurements, events and coverage related information. The logged or collected measurements or relevant information are then sent to the network. According to the traditional approach, the operator has to collect similar information by means of the so called drive tests and manual logging. The MDT feature is described in 3GPP TS 37.820. The UE can collect the measurements during connected state as well as in low activity states such as idle state in UTRA/E-UTRA, cell PCH states in UTRA. A few examples of potential MDT UE measurements are:

Mobility measurements e.g. RSRP, RSRQ;
RA failure;
Paging Channel Failure (PCCH Decode Error);
Broadcast Channel failure;
Radio link failure report.

The E-UTRAN also employs the concept of a SON. The objective of the SON entity is to allow operators to automatically plan and tune the network parameters and configure the network nodes. The conventional method is based on manual tuning, which consumes enormous amount of time, and resources and requires considerable involvement of work force. In particular due to network complexity, to a large number of system parameters, and to IRAT technologies, it is very attractive to have reliable schemes and mechanism which could automatically configure the network whenever necessary. This can be realized by SON, which can be visualized as a set of algorithms and protocols performing the task of automatic network tuning, planning, configuration, parameter settings. In order to accomplish this, the SON node requires measurement reports and results from other nodes, such as the UE, or the RBS.

In general the heterogeneous network under consideration is distinguished by the time sharing of the radio resources between a high power network node, also known as a macro node such as a macro eNodeB, and a low-power network node, such as a pico eNodeB, a micro eNodeB, or a Home eNodeB, as described above. The time sharing of resources between the high- and low-power nodes is done in the downlink and/or uplink. It would be desirable to provide techniques, mechanisms, methods, devices, software and systems which, for example, exploit heterogeneous network deployment and configuration scenarios to enhance the performance.

SUMMARY

It is therefore an object to address some of the problems outlined above, and to provide a solution for improving performance of wireless devices in a network using restricted measurement patterns and/or low-interference subframe patterns for inter-cell interference coordination. This object and others are achieved by the methods, the wireless device and the radio network node according to the independent claims, and by the embodiments according to the dependent claims.

In accordance with a first embodiment, a method in a wireless device for improving wireless device performance is provided, when the wireless device is served by a radio network node of a radio communication network using restricted measurement patterns and/or low-interference subframe patterns for inter-cell interference coordination. The method comprises identifying an occasion comprising a time period during which at least one time-frequency resource element, in a subframe that is transmitted between the wireless device and the radio network node, does not comprise information intended for the wireless device, or is not a time-frequency resource element in which the wireless device is expected to transmit. The subframe is at least one of the following: a low-interference subframe comprised in a low-interference subframe pattern used by the radio network node; a subframe not comprised in a restricted measurement subframe pattern used by the radio network node; a subframe comprised in a random access response, RAR, window, which subframe does not overlap with a low-interference subframe comprised in a low-interference subframe pattern used by the radio network node. The method further comprises performing an auxiliary action during the identified occasion to improve the wireless device performance.

In accordance with a second embodiment, a method in a radio network node of a radio communication network using restricted measurement patterns and/or low-interference subframe patterns for inter-cell interference coordination is provided. The method is suitable for supporting mobility, positioning, or network management. The radio network node is serving a wireless device. The method comprises receiving a result from the wireless device. The result is related to an auxiliary action performed by the wireless device during an occasion. The occasion comprises a time period during which at least one time-frequency resource element, in a subframe that is transmitted between the wireless device and the radio network node, does not comprise information intended for the wireless device, or is not a time-frequency resource element in which the wireless device is expected to transmit. The subframe is one of the following: a low-interference subframe comprised in a low-interference subframe pattern used by the radio network node; a subframe not comprised in a restricted measurement subframe pattern used by the radio network node; a subframe comprised in a random access response, RAR, window, which subframe does not overlap with a low-interference subframe comprised in a low-interference subframe pattern used by the radio network node. The method further comprises using the result to perform a mobility, positioning, or network management task.

In accordance with a third embodiment, a wireless device for improving wireless device performance is provided. The wireless device is configured to be served by a radio network node of a radio communication network using restricted measurement patterns and/or low-interference subframe patterns for inter-cell interference coordination. The wireless device comprises a processing circuit configured to identify an occasion comprising a time period during which at least one time-frequency resource element, in a subframe that is transmitted between the wireless device and the radio network node, does not comprise information intended for the wireless device, or is not a time-frequency resource element in which the wireless device is expected to transmit. The subframe is at least one of the following: a low-interference subframe comprised in a low-interference subframe pattern used by the radio network node; a subframe not comprised in a restricted measurement subframe pattern used by the radio network node; a subframe comprised in a random access response, RAR, window, which subframe does not overlap with a low-interference subframe comprised in a low-interference subframe pattern used by the radio network node. The processing circuit is further configured to perform an auxiliary action during the identified occasion to improve the wireless device performance.

In accordance with a fourth embodiment, a radio network node of a radio communication network using restricted measurement patterns and/or low-interference subframe patterns for inter-cell interference coordination is provided. The radio network node is configured to serve a wireless device. The radio network node comprises a receiver configured to receive a result from the wireless device. The result is related to an auxiliary action performed by the wireless device during an occasion. The occasion comprises a time period during which at least one time-frequency resource element, in a subframe that is transmitted between the wireless device and the radio network node, does not comprise information intended for the wireless device, or is not a time-frequency resource element in which the wireless device is expected to transmit. The subframe is one of the following: a low-interference subframe comprised in a low-interference subframe pattern used by the radio network node; a subframe not comprised in a restricted measurement subframe pattern used by the radio network node; a subframe comprised in a random access response, RAR, window, which subframe does not overlap with a low-interference subframe comprised in a low-interference subframe pattern used by the radio network node. The radio network node further comprises a processing circuit configured to use the result to perform a mobility, positioning, or network management task.

One advantage of embodiments of the invention is that in heterogeneous networks, the subframes or time instances, the so called interstitial occasions, which are not used for normal operation, can be used for several non-urgent tasks. The network resources are therefore utilized in a more efficient manner. Furthermore, the UE can perform additional measurements without impacting the performance of the normal measurements.

Another advantage is that the UE can benefit of having identified the interstitial occasions for saving its battery consumption.

Furthermore, the network can utilize the UE measurements or statistics from the measurements during the interstitial occasions for performing network planning and automatic tuning of the parameters especially associated with the heterogeneous network.

Other objects, advantages and features of embodiments will be explained in the following detailed description when considered in conjunction with the accompanying drawings and claims.

BRIEF DESCRIPTION OF THE DRAWINGS

The exemplary embodiments described below will be understood, in conjunction with the drawings submitted herewith in which.

DETAILED DESCRIPTION

Figure 1:
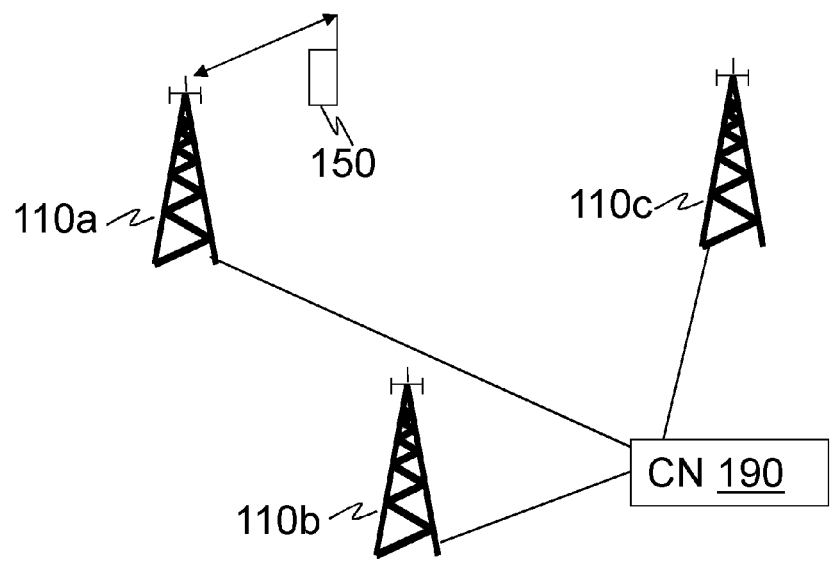
FIG. 1 is a schematic illustration of an LTE radio access network.
Figure 2A:
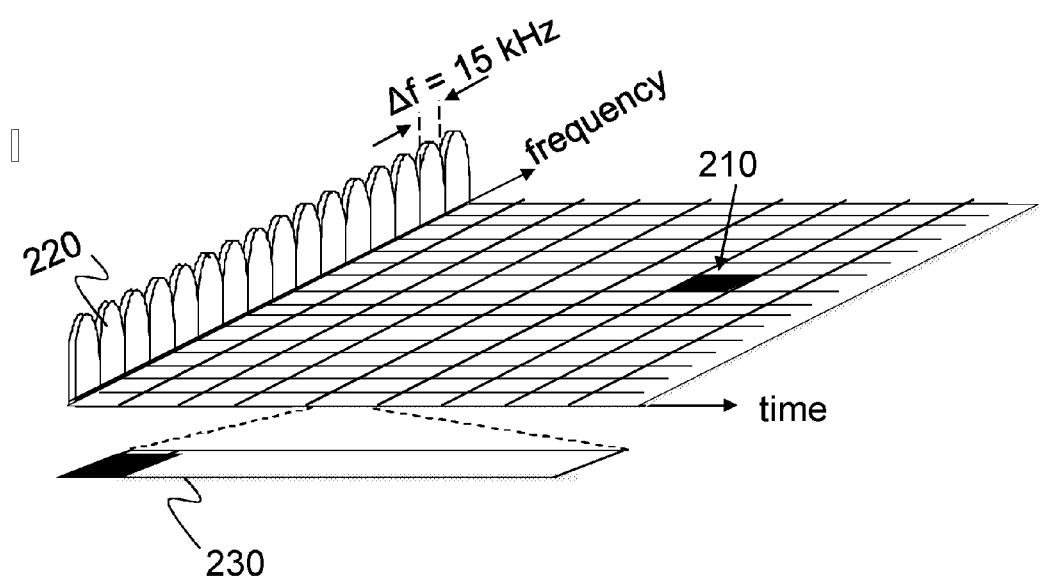
FIG. 2a is a schematic illustration of an LTE OFDM downlink signal in the frequency/time domain.
Figure 2B:
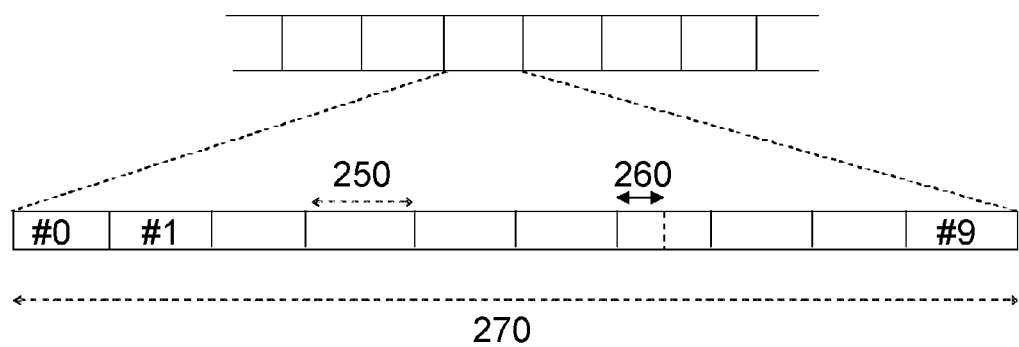
FIG. 2b is a schematic illustration of a subframe associated with an LTE OFDM signal in the time domain.
Figure 3:
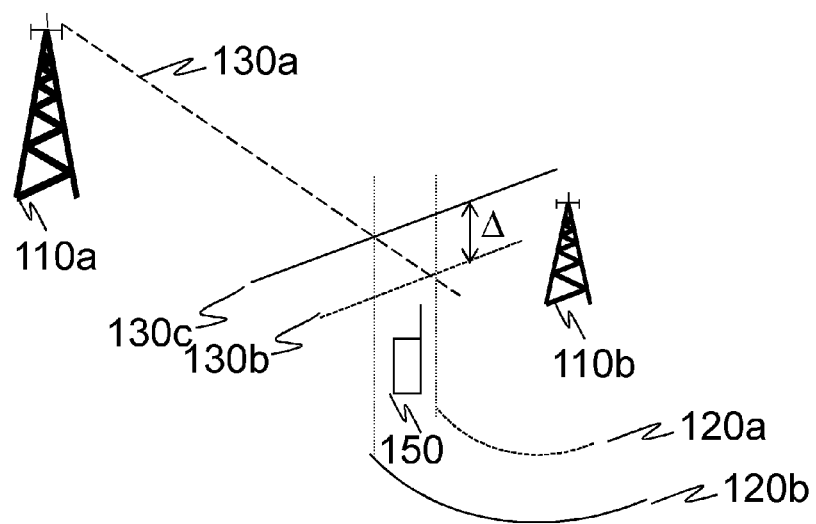
FIG. 3 is a schematic illustration of cell range expansion in heterogeneous networks.
Figure 4A:
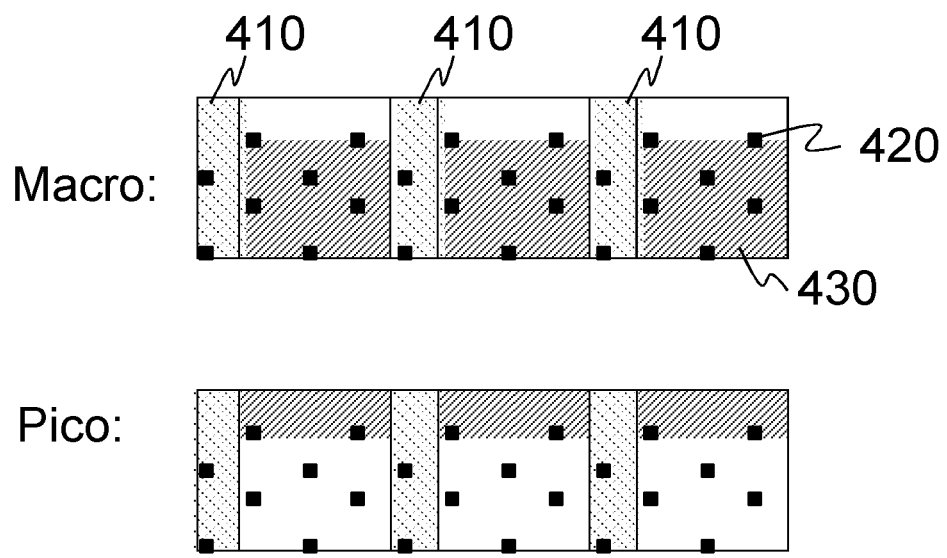
FIGS. 4a-b are schematic illustrations of interference coordination on data channels.
Figure 4B:
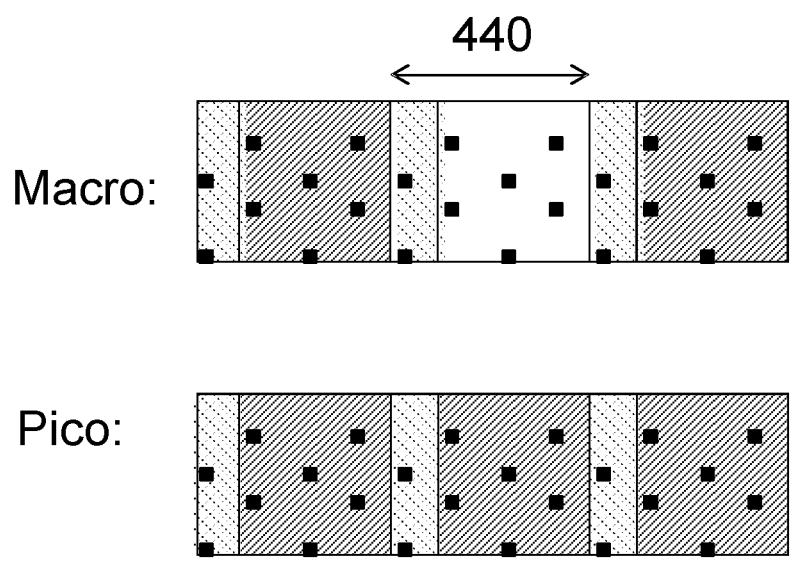
Figure 5A:
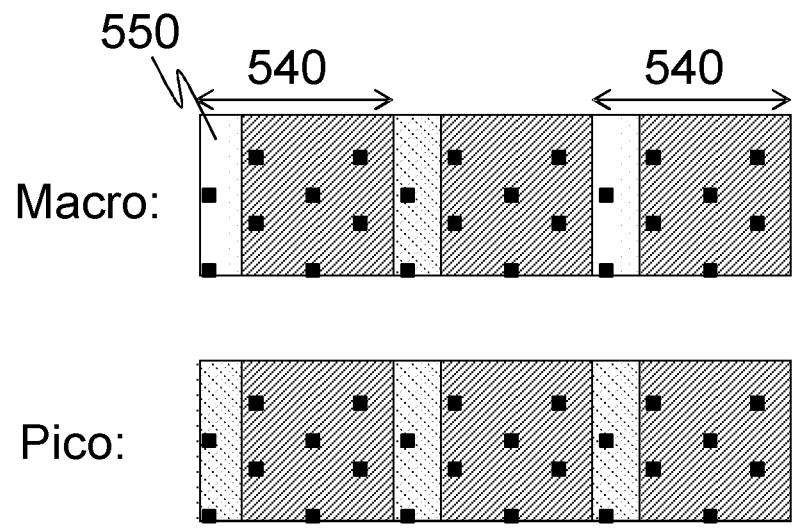
FIGS. 5a-c are schematic illustrations of interference coordination on control channels.
Figure 5B:
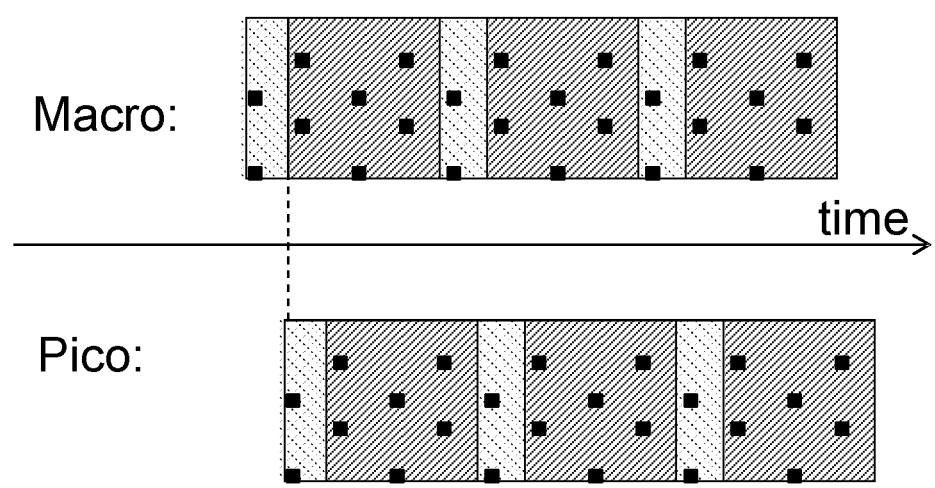
Figure 5C:
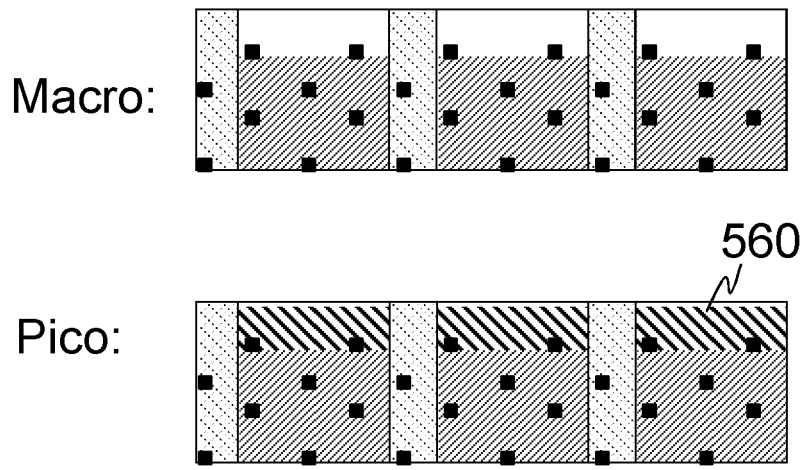

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an Application Specific Integrated Circuit (ASIC). It will also be appreciated that while the embodiments are primarily described in the form of a method and a node, they may also be embodied in a computer program product as well as in a system comprising a computer processor and a memory coupled to the processor, wherein the memory is encoded with one or more programs that may perform the functions disclosed herein.

Embodiments are described in a non-limiting general context in relation to an example scenario with an E-UTRAN heterogeneous network architecture. However, it should be noted that the embodiments may be applied to other radio access network technologies, or even networks with multiple RATs, where restricted measurement patterns and/or low-interference subframe patterns are applied for ICIC.

The problem of limited performance in heterogeneous networks due to domain sharing of the radio resources between high- and low-power network nodes is addressed by a solution where the UE can perform one or more auxiliary actions during one or more interstitial occasions to enhance its performance.

The auxiliary actions carried out by the UE may, for example, comprise of one or more of the following:
  Perform inter-frequency measurements;
  Perform inter-RAT measurements;
  Enhance battery life by turning off receiver and/or transmitter, i.e. going into a sleep mode;
  Perform best-effort measurements or minimum-configuration measurements. One example is measurements for which either less strict requirements or no requirements or optional requirements may apply, where the requirements may be e.g. accuracy or measurement time period requirements. Another example is measurements over a smaller bandwidth or a selected subset of time-frequency resources;
  Measuring for specific tasks such as non-urgent or second priority tasks, or logging of measurements for the specific tasks, such as MDT or SON measurements.
  Perform short-range low-power radio communication, e.g. with nearby devices.

The interstitial occasions may, for example, include one or more of the following set of subframe or time instances:
  DL and/or UL ABS or restricted measurement subframes for a UE connected to an aggressor node, which may e.g. be a macro node.
  DL and/or UL non-ABS or restricted measurement subframes for a UE connected to a victim node such as a pico node, where subframes overlapping with ABS in an aggressor node are configured for measurements, or scheduling.
  DL and/or UL ABS or restricted measurement subframes and DL and/or UL non-ABS or non-restricted measurement subframes for UE connected to a node which is both victim and aggressor, such as a UE connected to pico eNodeB which is close to an aggressor macro eNodeB and is also aggressor to another pico eNodeB.
  DL subframes in a RAR window not containing the RAR.
  Low-activity occasions in frequency, such as some subbands or clusters of sub-bands.

The UE can, for example, determine or identify the interstitial occasion based on one or more of the following pieces of information:
  Existing information, such as a restricted subframe measurement pattern, a scheduling pattern, a CSI pattern, and signal quality measurements.
  Explicit signaling from the network node. One example is signaling an indication that the UE shall be scheduled only during a scheduling pattern or a CSI pattern. Another example is signaling an indication of the transmit activity of the transmitting node, such as an ABS pattern of an eNodeB.

The auxiliary task for which the performance is enhanced may be determined and decided autonomously by the UE, or it may be configured by a network node, such as a radio network node or another network node. It may also be a combination of both.

The method in the UE may in embodiments of the invention further comprise the steps of storing, at least in part, in a memory unit, and/or reporting, the results associated with the auxiliary actions performed during the interstitial occasions. The results may be reported to the configuring network node such as a radio network node or other network node, or to another radio network node, to another network node, or to a UE. The reporting of results to another UE can be used by UEs involved in communication among them using a device to device (D2D) communication link.

The method in the network node may, for example, comprise the steps of:
  receiving the UE reporting the results associated with auxiliary actions performed during the interstitial occasions,
  storing, at least in part, the received results, and/or
  using the received results for performing one or more of network monitoring, management, and planning tasks, such as ABS configuration, tuning of deployment parameters, and configuration of nodes.

According to an embodiment, a method for performing an auxiliary action in a UE comprises: determining that an auxiliary action is to be performed by the UE, identifying an interstitial occasion in which to perform the auxiliary action, and performing the auxiliary action during the identified interstitial occasion. Similarly, a UE according to this embodiment comprises: a processor configured to determine that an auxiliary action is to be performed, to identify an interstitial occasion in which to perform the auxiliary action, and to perform the auxiliary action during the identified interstitial occasion. The auxiliary action can, for example, be an action which is either (a) not required to be performed by the UE or (b) is required to be performed but not within a specified time period. The interstitial occasion can, for example, be a time period during which the UE is not likely to be served and/or during which the UE is not expected to perform a required action.

According to another exemplary embodiment, a network node can receive information associated with the performance of an auxiliary action during an interstitial occasion and use the information to perform a network function, such as a positioning, a mobility, or a network management task, Similarly, a network node can include a processor configured to receive information associated with the performance of an auxiliary action during an interstitial occasion and further configured to use the information to perform a network function.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

As described above, heterogeneous networks under consideration are in general distinguished by the time sharing of the radio resources between high power network nodes and low-power network nodes. The time sharing of resources between the high- and low-power nodes is done in the downlink and/or uplink. According to exemplary embodiments, there are heterogeneous network deployment and configuration scenarios which can be exploited by the UE for enhancing its performance. Some of these scenarios are listed below:

1. A UE connected to a low power node such as a pico eNodeB may perform the various types of measurements over the signals transmitted in the restricted set of subframes. Examples of measurements are RRM measurements such as cell identification, RSRP, RSRQ, and radio link monitoring, and positioning measurements such as UE Rx-Tx time difference measurement. For example in release 10, the intra-frequency RRM performance requirements are specified under the assumption that the serving cell shall provide at least one restricted subframe per frame for the intra-frequency measurements. This means that a Low power node UE (LUE), i.e. a UE connected to a low power node, would typically not use the remaining subframes for the intra-frequency measurements.
2. A UE connected to a low power node such as the pico eNodeB typically performs CSI measurements, such as measurements of Cell Quality Indicator (CQI), Precoding Matrix Indicator (PMI), and Rank Indicator (RI), over signals transmitted in the restricted set of subframes. For example in release 10, the CSI performance requirements are being specified under the assumption that the serving cell shall provide at least one restricted subframe per frame for the intra CSI measurements. This means that the LUE will typically not use the remaining subframes for the CSI measurements.
3. A UE connected to or camped on a low power node after sending a random access may need to receive the corresponding RAR in downlink subframes which overlap with the ABS subframes in the aggressor cell. This means the LUE does not have to monitor all the DL subframes for the RAR over the RAR window which is continuous according to the current standard.
4. Due to a smaller cell coverage area, there is generally very low traffic in the layer served by the low power nodes, such as pico eNodeB, micro eNodeB, and home eNodeB, compared to the macro node layer. This means that the LUE shall typically be scheduled in a limited number of subframes in DL and/or UL. In principle this means that the LUE will not receive and/or transmit data in most of the subframes.
5. A UE connected to a macro node such as a macro eNodeB, also referred to as a MUE, is not typically served, i.e. receiving data, in ABS subframes configured in the macro node. The ABS subframes can be configured in the downlink and/or uplink. In principle this means that the MUE will not receive and/or transmit data in some of the subframes.
6. A UE connected to or camped on a macro node after sending the random access will not typically receive the corresponding random access response in the ABS subframes configured in the macro node. Similarly the MUE will not send random access in the uplink ABS subframes. This means in principle the MUE will not receive RAR and/or transmit RA in some of the subframes.

Embodiments described herein enable the UE to improve various aspects of its performance using aspects of the above six, or other, configurations.

Figure 6:
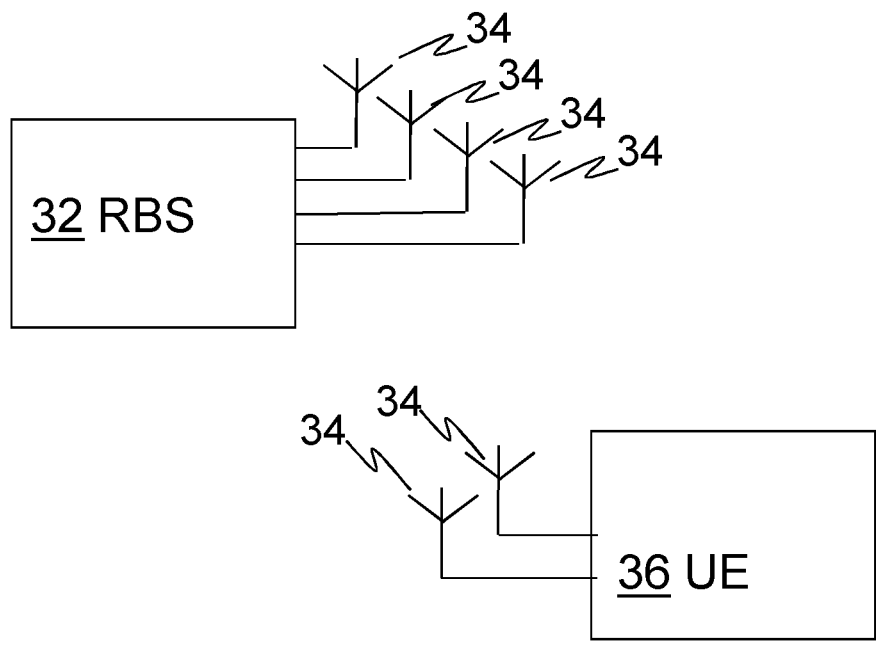
FIG. 6 is a block diagram schematically illustrating an exemplary RBS and UE in which exemplary embodiments can be implemented.
Figure 7:
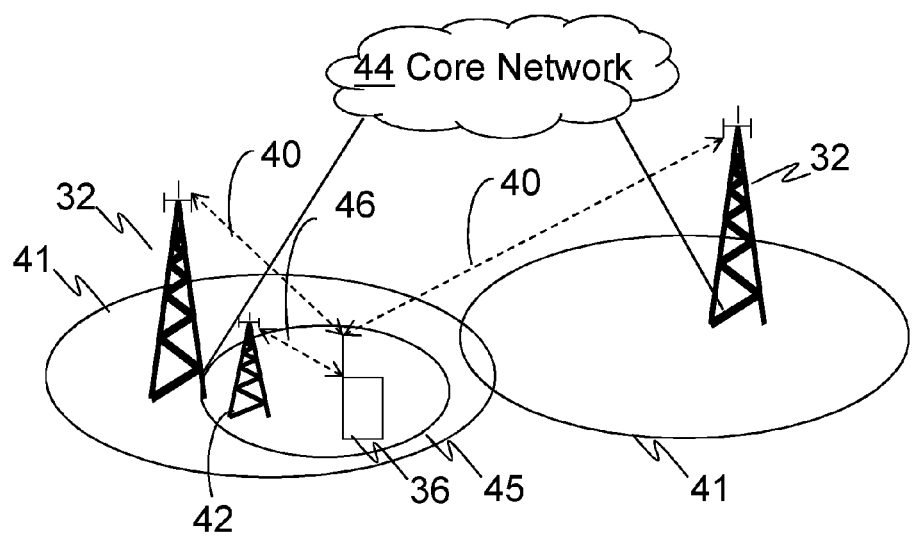
FIG. 7 is a schematic illustration of a radio communication system in which exemplary embodiments can be implemented.

To first provide some context for the following exemplary embodiments related to performing auxiliary functions during interstitial occasions, the exemplary radio communication system is shown from two different perspectives in FIGS. 6 and 7, respectively. To increase the transmission rate of the systems, and to provide additional diversity against fading on the radio channels, modern wireless communication systems include transceivers that use multi-antennas, often referred to as a Multiple-Input Multiple-Output (MIMO) systems. The multi-antennas may be distributed to the receiver side, to the transmitter side and/or provided at both sides as shown in FIG. 6. More specifically, FIG. 6 shows a base station 32 having four antennas 34 and a user terminal, also referred to herein as a UE 36 having two antennas 34. The number of antennas shown in FIG. 6 is exemplary and is not intended to limit the actual number of antennas used at the base station 32 or at the user terminal 36 in the exemplary embodiments to be discussed below.

In the LTE architecture an evolved NodeB (eNodeB) may correspond to the RBS, i.e., an RBS is a possible implementation of the eNodeB. However, the term eNodeB is also broader in some senses than the conventional RBS since the eNodeB refers, in general, to a logical node. The term RBS is used herein as inclusive of a base station, a NodeB, an eNodeB or other nodes specific for other architectures. An eNodeB in an LTE system handles transmission and reception in one or several cells, as shown for example in FIG. 7.

FIG. 7 shows, among other things, one UE 36 and two eNodeBs 32 associated with a cell 41 each. The UE 36 uses dedicated channels 40 to communicate with the eNodeB(s) 32, e.g., by transmitting or receiving Radio Link Control (RLC) Protocol Data Units (PDU) segments as known in the art. The two eNodeBs 32 are connected to a Core Network 44. Additionally, one or more low power nodes, e.g., node 42 associated with pico cell 45 may also be communicating or may be able to communicate with the UE 36 via uplink and downlink signals 46. The UE 36 has similar transmit chain elements as the eNodeB 32 for transmitting on the uplink (UL) toward the eNodeB 32, and the eNodeB 32 also has similar receive chain elements as the UE 36 for receiving data from the UE 36 on the UL. Similarly, low power node 42 may also include similar circuitry/functionality for both UL and DL reception and transmission.

Having described some exemplary LTE devices in which aspects of performing auxiliary actions during interstitial occasions according to embodiments can be implemented, the discussion now returns to such embodiments. Among other things, these embodiments include one or more of:

Determination of the auxiliary actions and their need to enhance performance;
Configuring of the auxiliary actions;
Determination and configuring of the interstitial occasions;
Performing the auxiliary actions and reporting results;
Method in network node for utilizing the reporting results for network management and planning.

Each of these aspects will be discussed in more detail below.

Starting with methods and devices for determining or selecting which auxiliary actions to perform, consider that auxiliary actions as used in these embodiments generally refer to certain tasks or actions whose performance is not guaranteed or whose performance is not required to occur within a strict specified limit. Auxiliary actions can, for example, be regarded as actions performed with the best-possible-effort with the aim of improving overall performance. Thus, the auxiliary actions described in at least some embodiments can be said to differ from, for example, other best-effort actions in that the former are done by exploiting the time instances in a heterogeneous network when the UE is not likely to be served or is not supposed or expected to perform the usual or normal measurements.

Another way to understand which actions are included in the term "auxiliary actions" is by way of non-limiting examples. Some examples of auxiliary actions include:
  Performing second inter-frequency measurements;
  Performing second inter-RAT measurements;
  Performing minimum-configuration measurements;
  Enhancing battery life by turning off its receiver and/or transmitter, i.e. going into sleep mode;
  Logging of second measurements for non-urgent tasks, such as MDT, SON measurements;
  Processing of received data;
  Performing short-range low-power radio communication, e.g., with nearby devices.

These examples are discussed in more detail below.

In connected mode the normal inter-frequency/inter-RAT measurements are performed during the periodic measurement gaps which are configured by the network. These measurements are termed as first set of measurements for simplicity, e.g., first inter-frequency and first inter-RAT measurements. The first set of inter-frequency and inter-RAT measurements are thus done in designated time instances, i.e. measurement gaps, and thus meet the pre-determined performance requirements. The performance requirements are expressed in terms of e.g. measurement delay, and measurement accuracy of the measurement quantity. Examples of first inter-frequency measurements are inter-frequency cell identification, RSRP, and RSRQ. Examples of first inter-RAT measurements are inter-RAT UTRAN CPICH RSCP, CPICH Ec/Io, and inter-RAT GERAN RSSI. One example of a first inter-frequency RSRP and RSRQ measurement delay is 480 ms.

In contrast the second inter-frequency or inter-RAT measurements according to an embodiment are carried out by the UE during one or more interstitial occasions, which is elaborated upon below. This means that the UE has to switch its receiver to tune to the inter-frequency carrier or the inter-RAT carrier. While performing the second inter-frequency or inter-RAT measurements, the UE with a single receiver cannot receive data or perform any measurement on the serving carrier frequency.

The second inter-frequency/inter-RAT measurements according to this embodiment are not guaranteed to meet the same requirements as those achieved by the corresponding first inter-frequency/inter-RAT measurements. For example the second inter-frequency RSRP and RSRQ measurement delay may be 2 seconds or even longer. However, one advantage is that the serving node does not need to configure measurement gaps for all inter-frequency/inter-RAT measurements. It should also be noted that the second inter-frequency/inter-RAT measurements in embodiments of the present invention can be done for various purposes. For example they may be associated with mobility, positioning (non-urgent/non-emergency), and non-guaranteed bit rate or low-priority service. The measurement delay of the second measurement may depend upon one or more factors for example:
  Available interstitial occasions, i.e., the amount of time-frequency resources, and their continuity in time and/or frequency;
  Number of auxiliary actions to perform;
  Priority of auxiliary actions;
  Radio conditions associated with the auxiliary action.

Another possibility for an auxiliary action is that the UE turns off its receiver and/or transmitter during one or more interstitial occasions to save its battery life. The UE may also use an interstitial occasion for performing multiple auxiliary tasks, e.g. N out of K subframes are used for measurements and remaining K-N for battery saving.

The UE can also perform certain non-urgent measurements as auxiliary actions, which actions are termed as third measurements in these embodiments, during the interstitial occasions. Examples of third measurements are signal strength, signal quality, propagation delay, broadcast channel decoding failure rate or Block Error Rate (BLER), control channel BLER, and measurements for positioning. The third measurements are used by the network in background by virtue of features like MDT, and SON. The performance requirements for the third measurements will typically be lower than the performance during the normal operation.

It can be challenging for the UE to perform measurements and/or receive data and process them at the same time, i.e., in the same subframe. This leads to overall delay for all or most of tasks when multiple tasks are done in parallel. The UE can process some of the less time-critical tasks during the interstitial occasions.

According to some embodiments, the UE autonomously determines or selects one or more auxiliary tasks which the UE may perform during the interstitial occasions. The UE may use one or more criteria when selecting the task. In one example if the UE battery is low or below threshold then the UE may use the occasions for going into sleep mode. In another example, if the UE battery is low or below threshold, the UE may use a minimum configuration during the interstitial occasions and perform best-effort measurements or participate in a best-effort communication. The UE may e.g., use any of a smaller bandwidth, more sparse measurement occasions, or lower transmit power. In yet another example, if the UE has been configured to perform certain number of third measurements, e.g. for MDT or for SON purposes, but only few of them have been measured, then the UE may use these occasions for mainly performing one or more sets of third measurements.

In still another example, if the UE battery is used for some local application, e.g. for edition, local games, or music, then the UE may use the occasions only for performing certain type of measurements e.g. the first, second or third measurements as described above. In yet another example, upon identifying a nearby device, the UE may decide to communicate with that device in a resource-saving mode, e.g., at a reduced transmit power, during the interstitial occasions.

According to another embodiment, determination or selection of one or more auxiliary actions to be performed by a UE during interstitial occasions is determined by a network node. For example, the network node, which may be a serving eNode B, a positioning node, an MDT node, or a SON node, requests the UE to perform any of the auxiliary task(s) listed above during the interstitial occasions. The network may even explicitly permit the UE to turn off its receiver and/or transmitter for the purpose of saving its battery life. As stated earlier, measurements related to the auxiliary tasks are not necessarily required to meet any strict requirements as met by the normal measurements or first measurements. This also applies when the network explicitly requests specific auxiliary task(s).

According to another embodiment, determination or selection of one or more auxiliary actions to be performed by a UE during interstitial occasions can be determined mutually by the UE and one or more network nodes. In this embodiment both the UE and the network node mutually decide the auxiliary task(s) which are to be performed by the UE during the interstitial occasions. In one example the network node configures the UE to perform multiple auxiliary tasks. The UE then itself selects one or more of the configured tasks. For example assume that the serving eNode B configures the UE with the following three tasks: second inter-frequency measurement, battery saving, and third measurement for MDT. If the UE battery is below a certain threshold, which can be configured by network or be UE implementation dependent, then the UE primarily saves its battery by switching off its receiver and/or transmitter during the occasions. Otherwise the UE may perform one or more of the configured measurements.

According to still other embodiments, methods, devices and systems are provided for determining the occurrence of interstitial occasions. The interstitial occasions as that term is used herein refers to the time instances which are used by the UE operating in heterogeneous network environment for performing one or more auxiliary actions described earlier. In other words this time period is an opportunity for the UE to perform auxiliary actions in between the periods associated with the normal operations. The interstitial occasions can be in both the UL and DL and may also apply to one or more parts of the bandwidth. Typically one interstitial occasion is at least one subframe, i.e. 1 ms in LTE. However, an interstitial occasion according to embodiments of the invention can be as small as one OFDM Access (OFDMA) symbol or Single Carrier Frequency Division Multiple Access (SC-FDMA) symbol, or one time slot (0.5 ms in LTE). The interstitial occasion thus comprises a time period corresponding to one or more time-frequency resource elements.

As the UE does not have to perform, or does not typically perform normal operations, during the interstitial occasion, the UE can enhance its performance by performing one or more auxiliary tasks or actions during that time period. The normal operations carried out during the recommended or designed time instances are typically assigned by the serving network node. The interstitial occasions and the occasions for normal operations may also be complementary to each other. This will be apparent from the examples described below. In some cases, however, they do not have to be complementary to each other since e.g. ABS may relate to certain but not all channels. Therefore some channels may have to be measured outside an ABS pattern, such as synchronization signals. Further, there may also be other signals in ABS, such as positioning reference signals that overlay the pattern. Therefore, to identify interstitial occasions there may be additional information needed. Such additional information may e.g. comprise information whether positioning reference signals are transmitted, or whether a UE is configured for positioning measurements. Examples of normal operations comprise reading of control channels such as a PDCCH, data scheduling in downlink, data scheduling in uplink, RRM measurements, RLM measurements, positioning measurements on designed or assigned subframes, RA transmission, RAR reception, and system information reading.

In order to illustrate the concept of the interstitial occasion, several examples are shown in FIGS. 8a-d. In the example in FIG. 8a, a LUE is connected to a pico cell in a heterogeneous network, and is interfered by an aggressor macro cell. The serving pico cell may request the LUE to perform RRM measurements in a restricted set of subframes 801, also known as a restricted subframe pattern for RRM measurements. Separate patterns are assigned for serving cell and neighbor cell measurements. Similarly the LUE may also be configured by the serving pico cell to perform CSI measurements only during the subframes 802 belonging to the CSI pattern. The serving pico cell may also perform downlink data transmission or scheduling to the UE only during subframes 802 belonging to the CSI pattern. Hence the subframes belonging to the restricted subframe pattern and the CSI or scheduling pattern, 801 and 802 respectively, i.e. two subframes per DL frame 804, are the only ones used by the UE for normal operation. The remaining subframes 803 are regarded as the interstitial occasions, which can be used by the UE for carrying out one or more auxiliary actions. In case of FDD the interstitial occasion may comprise eight downlink subframes which do not include subframes number 0 and 5 which are used for synchronization signals. In TDD the number of DL and UL interstitial occasions per frame depends on the TDD UL-DL subframe configuration and on TDD special subframe configurations. The example in FIG. 8a for instance provides substantial UE battery saving opportunity during the interstitial occasions. Similarly the UE can also speed up some of the measurements, e.g. inter-RAT UTRAN measurements, which otherwise require measurement gaps.

Figure 8A:
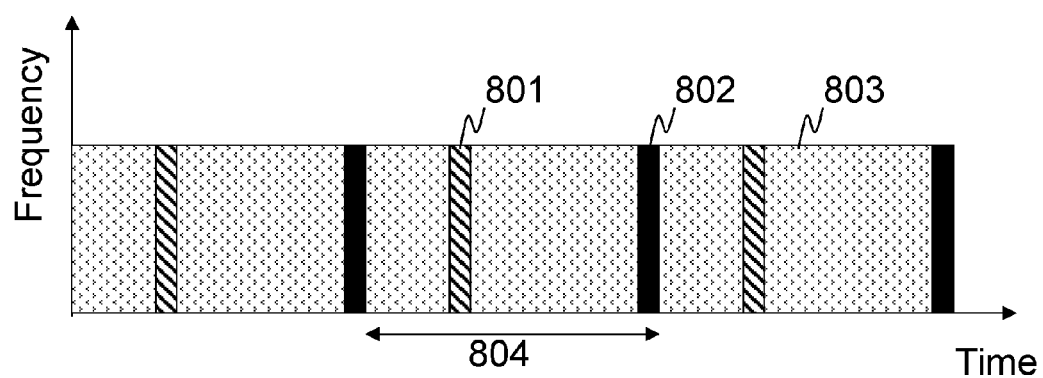
FIGS. 8a-d are schematic illustrations of examples of interstitial occasions.
Figure 8B:
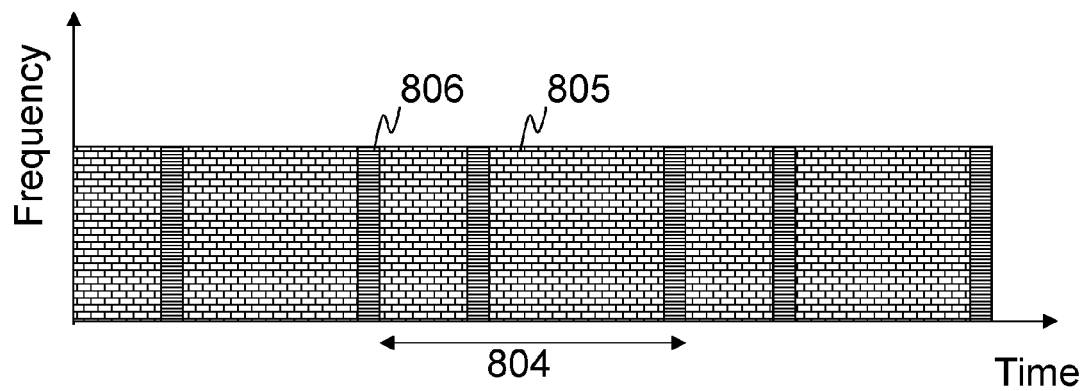

The example in FIG. 8b shows a configuration of ABS with two ABS subframes 806 per frame 804 in an aggressor macro cell. The ABS in the macro cell lowers interference in the overlapping subframes in the victim pico cell(s). As the macro-cell connected UE (MUE) is typically not scheduled during the ABS subframes, the ABS subframes 806 configured in an aggressor cell is another example of an interstitial occasion. All other subframes 805 are available for scheduling. The MUE connected to the aggressor macro cell in FIG. 8b can as an example save its battery life by turning off its receiver. Turning off the receiver is one example of an auxiliary action. Similarly the MUE can also perform for instance second or third measurements on another carrier or RAT during the interstitial occasion, especially if consecutive ABS subframes are configured. Another similar example of interstitial occasions is UL ABS configured in a femto CSG cell to avoid strong UL interference from a nearby non-CSG UE, where the UL ABS subframes may comprise an interstitial occasion in UL for femto UEs.

Figure 8C:
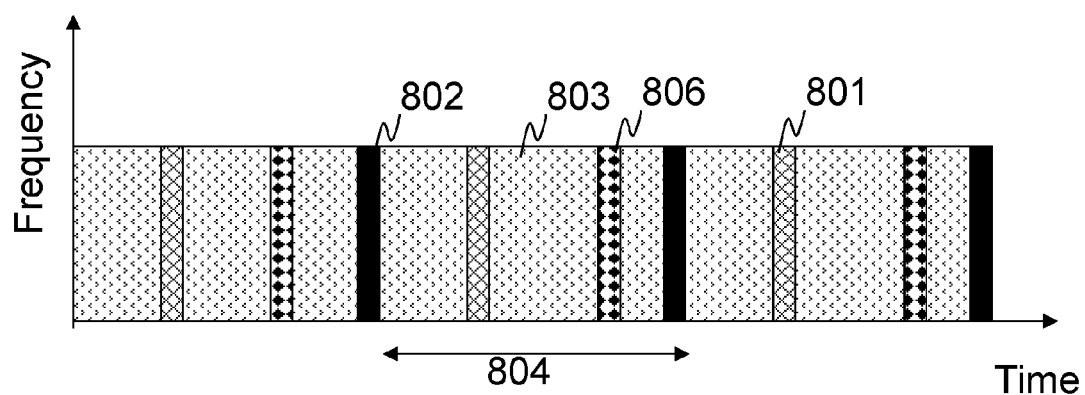

The example in FIG. 8c illustrates a scenario in which a LUE connected to a pico cell is interfered by an aggressor macro cell, and a serving pico cell is aggressor to other pico cell(s). This means that the scenario in FIG. 8c combines the features of the scenarios exhibited in FIGS. 8a and 8b. Hence in FIG. 8c the pico cell also configures the ABS subframes. This means that the interstitial occasion comprises ABS subframes 806 as well as the subframes 803 which are not used for normal operation.

Figure 8D:
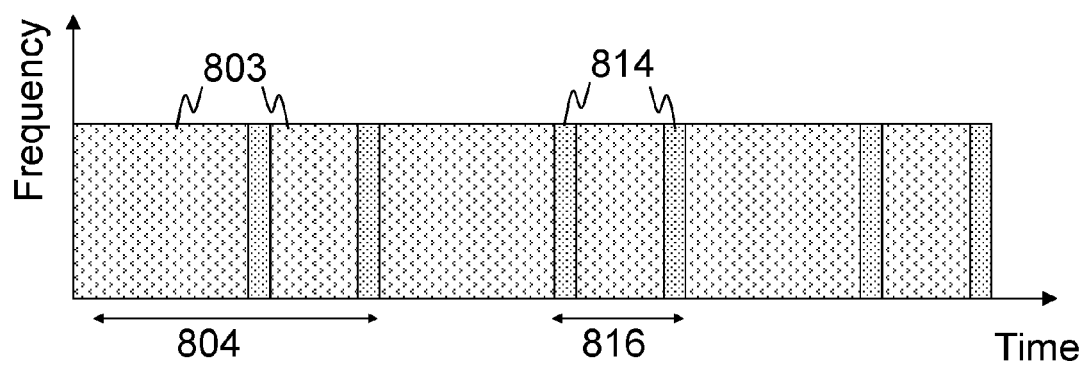

FIG. 8d shows another example of an interstitial occasion which can be used for various auxiliary actions by the UE connected to a victim pico eNodeB while waiting for the RAR upon sending a RA. In this example it is assumed that the serving cell sends the RAR only in selected DL subframes 814 over the RAR window 816. The selected DL subframes 814 are aligned with the ABS subframes in the aggressor cell to ensure that the UE is able to successfully receive the RAR. Hence the UE can use the subframes 803 which are not used for RAR for performing one or more of the auxiliary tasks. For instance, the UE can enter in sleep mode, i.e. turn off its receiver and/or transmitter, in order to save the battery power consumption.

Hereinafter, some techniques for identifying or determining when such interstitial occasions occur will be described. According to an embodiment, the UE implicitly or autonomously determines or identifies one or more interstitial occasions when operating in a heterogeneous network. Several examples of how this can occur will now be described. Although the examples focus on identifying subframes as the interstitial occasion, the interstitial occasions may correspond to time periods during one or a few time-frequency resource elements in such an identified subframe according to other embodiments.

In one example the UE identifies that during certain time instances the network node, e.g. the serving eNodeB, does not send control information such as PDCCH, Physical Hybrid ARQ Indicator Channel (PHICH), or Physical Control Format Indicator Channel (PCFICH), nor does it schedule the UE with UL and/or DL data. Especially if such time instances appear periodically, e.g. in DL subframes 2 and 6 in every frame, then the UE assumes that these subframes are interstitial occasions that can be used for performing an auxiliary action. This example is especially useful for the UE connected to an aggressor macro cell, where ABS subframes are configured to lower interference in neighboring victim pico cell(s). In ABS subframes the serving node generally does not send control channels and data.

In a second example, the serving network node simply indicates to the UE that DL and/or UL ABS, or any type of low interference DL and/or UL subframes, are configured in certain subframes in a frame with certain periodicity and over a certain time. For example, the ABS subframes can be DL subframe 3 in every frame with a periodicity of 40 ms. The network does not explicitly indicate that the UE will not be scheduled in the ABS subframes according to this embodiment. The UE then monitors the ABS subframes for control channel and data transmission. If no data is scheduled over certain time, e.g. over two frames, to this UE, then the UE assumes that these ABS subframes can be used for performing an auxiliary action. This example is also useful for the UE connected to an aggressor macro cell where ABS subframes are configured to lower interference in neighboring victim pico cell(s).

In a third example the UE utilizes the information about the restricted measurement subframe patterns or time instances, which are configured by the serving network node. The configured patters are for RRM measurements, CSI measurements, positioning measurements, and data scheduling. The UE then assumes that subframes not included in any of the configured patterns are not used for control channel and data transmissions. The UE can also verify this hypothesis by monitoring subframes which are not included in any of the configured patterns over certain time period, e.g. over a few frames. If there is no control channel and data transmission activity addressed to this UE in these subframes then the UE assumes that all the subframes which are not part of any of the configured patterns can be used for carrying out one or more of the auxiliary tasks.

Alternatively, or in combination with implicit determination of interstitial occasions, embodiments can employ explicit determination of interstitial occasions. The explicit determination can be based on an indication from the network node or it can be based on a pre-determined rule as described below.

Thus, according to one embodiment, the serving network node indicates or signals an interstitial occasion pattern to the UE. A pattern may e.g. comprise of a set of subframes per frame where the network will not serve a particular UE. For instance the network node configures an interstitial occasion pattern comprising of two DL subframes, e.g. subframe 0 and subframe 7, in every frame with 40 ms periodicity. A similar pattern can be defined for the UL. The UE can then use such a pattern for doing one or more auxiliary tasks.

According to another embodiment, the serving network node indicates to the UE that during the subframes associated with a certain pattern the UE shall not be scheduled. The UE can then use such a pattern for doing one or more auxiliary tasks. For example in an aggressor cell, the serving node can indicate to the UE that the UE will not be scheduled during the ABS subframes which belong to the configured ABS pattern. The serving node can alternatively indicate that the UE will not be scheduled in a sub-set of ABS subframes. The indication can be UE specific or specific to a group of UEs. The indication can even be cell specific, i.e. for all UEs in the cell. The ABS pattern can be configured in the UL and/or DL in the aggressor cell in order to lower interference in the corresponding subframes in the UL and/or DL respectively in the victim cell. The UE can use the explicit indication from the network node about the pattern and/or indicated subframes, or time instances, or parts of the bandwidth, or time frequency resource elements in the ABS pattern for doing one or more auxiliary tasks.

According to another aspect, the network may also indicate to the UE that the UE shall not be scheduled in any subframes other than those included in the configured scheduling and/or measurement pattern(s). This means that the UE can use the remaining subframes, i.e. subframes not belonging to the configured patterns for scheduling and/or measurements, for performing one or more auxiliary tasks.

Another technique for providing explicit determination of interstitial occasions is to use one or more predetermined rules. According to this embodiment it may also be predetermined that the UE shall not be scheduled during subframes belonging to a certain pattern when such a pattern is configured. It can also be pre-defined that the UE shall not be scheduled during a sub-set of subframes belonging to a certain pattern when such a pattern is configured. The sub-set can also be pre-defined. In an example, an ABS pattern #1 comprising of two consecutive subframes every frame with 40 ms periodicity is used in an aggressor cell. For example it can be pre-defined that during ABS pattern #1 the UE shall not be scheduled over the ABS subframes, i.e. over two ABS subframes in every frame. It may also be pre-determined that the UE shall not be scheduled over one ABS subframe per frame out of the two ABS subframes of ABS pattern #1. The UE can use this pre-defined information to perform the auxiliary tasks in the pre-defined set of ABS subframes.

Similarly it may also be pre-defined that when a certain pattern is configured for scheduling, e.g. pattern #2 comprising three subframes every frame, then the UE shall only be scheduled in subframes which belong to the configured scheduling pattern, i.e. pattern #2 in this example. The UE can use this pre-defined information to perform the auxiliary tasks in the subframes which don't belong to the scheduling pattern. Such rules may also apply for a certain UE category, or for a UE in a specific transmission mode, e.g. TM-9, or for a UE with a specific capability such as support of demodulation reference signals.

According to another embodiment, the UE performs one or more auxiliary actions during one or more interstitial occasions, where the auxiliary actions and the occasions are determined according to one or more of the embodiments described above. The UE may also store and signal the results associated with the auxiliary actions to a network node, which may be a serving radio node or any other node as described below. The results may be associated with the measurements, such as the second measurements, or third measurements described above. The results may also be reported relative to the first measurement results.

The UE may even report statistics about the UE power saving, such as a percentage of UE battery saving expressed in watts, during the interstitial occasions. Furthermore the UE may report the results proactively when the UE has uplink resources for reporting the results. Another option is that the network node, which may be a radio network node, a positioning node, a SON, or an MDT, explicitly configures and requests the UE to report the results. The network node may even configure the UE to derive statistics of the results associated with certain auxiliary actions over a certain time period which can be configurable or pre-defined, and report the logged results. One example of such a pre-defined time period is a 30 seconds time period.

The network node may be the serving network node, such as a serving eNodeB, a donor eNodeB, or a relay node, or any other network node. Examples of other nodes are a positioning node, an Operations Support System (OSS) node, an Operation and Maintenance (O&M) node, a SON node, an MDT node, or a network management and monitoring node. In one embodiment the UE reports the results to the serving node which in turn forwards the received results to the other nodes. For example the serving eNodeB may send the results to the OSS or positioning node. The OSS or positioning node may further report results to other nodes e.g. to the network management node or to the SON node.

The results can be used for various purposes, e.g. for mobility decisions by the radio network node, for positioning by the positioning node, or for network planning by other nodes. For example the second inter-RAT measurements can be used for the corresponding inter-RAT handover. But they can also be used for identifying coverage of cells on other RATs carriers e.g. on cdma2000, or UTRAN FDD.

As stated above, one or more of the network nodes can obtain various types of UE measurement results or statistics related to or associated with the auxiliary actions. According to this embodiment, the UE measurement statistics obtained directly from the UE or via other nodes may be used by the relevant network nodes for performing one or more network management tasks. Examples of network management tasks are:

Monitoring of the network performance. Examples are: interference or signal quality between restricted subframes and normal subframes, identification of aggressors such as UEs, cells, and subframes in a cell, and identification of victims such as UEs, cells, and subframes in a cell.

Configuration of parameters related to heterogeneous network deployment, e.g. ABS patterns density, and measurement or CSI pattern density. The configuration can also be done automatically e.g. based on SON principles.

Load balancing among cells and carrier frequencies and admission control.

Network planning and deployment, e.g. identification of a location to deploy new pico cells or remove existing ones.

Methods and Nodes

The method and nodes according to embodiments of the invention will hereinafter be described with reference to FIGS. 9a-12.

Figure 9A:
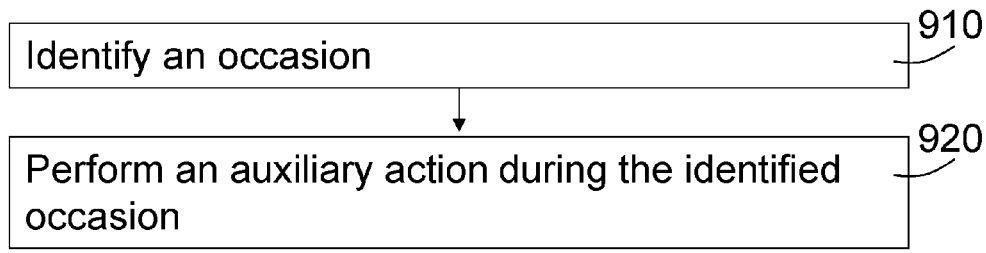
FIGS. 9a-b are flowcharts illustrating the method in a wireless device according to embodiments.

FIG. 9a is a flowchart illustrating a first embodiment of a method in a wireless device for improving wireless device performance. The wireless device is served by a radio network node of a radio communication network using restricted measurement patterns and/or low-interference subframe patterns for inter-cell interference coordination. A low-interference subframe may be an ABS and a low-interference subframe pattern may thus be an ABS pattern. The method comprises:

910: Identifying an occasion comprising a time period during which at least one time-frequency resource element, in a subframe that is transmitted between the wireless device and the radio network node, does not comprise information intended for the wireless device, or is not a time-frequency resource element in which the wireless device is expected to transmit. The subframe is at least one of the following types of subframes: a low-interference subframe comprised in a low-interference subframe pattern used by the radio network node; a subframe not comprised in a restricted measurement subframe pattern used by the radio network node; a subframe comprised in a random access response, RAR, window, which subframe does not overlap with a low-interference subframe comprised in a low-interference subframe pattern used by the radio network node. A low-interference subframe pattern may be used by the radio network node in the following ways: The radio network node may be transmitting the low-interference subframes in its cell according to the low-interference subframe pattern; or the radio network node may use the low-interference subframes transmitted in a neighboring cell according to the low-interference subframe pattern for scheduling transmissions in the own cell. The subframe that is transmitted between the wireless device and the radio network node may be a downlink subframe or an uplink subframe. As explained previously, the at least one time-frequency resource element may comprise all time-frequency resource elements of a subframe, or just one or a few time-frequency resource elements of the subframe, time-wise or frequency-wise. The identified occasion has previously been referred to as the interstitial occasion. In the following, the interstitial occasions will be referred to as occasions. Information intended for the wireless device may be either information dedicated for the wireless device, or it may be broadcasted information.

920: Performing an auxiliary action during the identified occasion to improve the wireless device performance. The auxiliary action may comprise one or more of the following actions: performing an inter-frequency and/or an inter-radio access technology measurement, performing a best-effort or a minimum-configuration measurement, turning off a receiver and/or a transmitter, processing received data, logging or performing measurements for non-urgent tasks, and performing low-power radio communication.

The best-effort or minimum-configuration measurement may be distinguished by at least one of the following: It must not meet any pre-defined requirement that is defined for regular measurements, but may meet a second set of requirements, which is less stringent than the pre-defined requirements; it may be performed over a reduced or a limited number or set of resources to meet at most the second set of requirements. An example of such a measurement could be to check a Global Cell ID (GCI) on a detected neighboring cell. It could be any measurement, including e.g. intra-frequency, inter-frequency, inter-RAT, or carrier aggregation measurements.

Figure 9B:
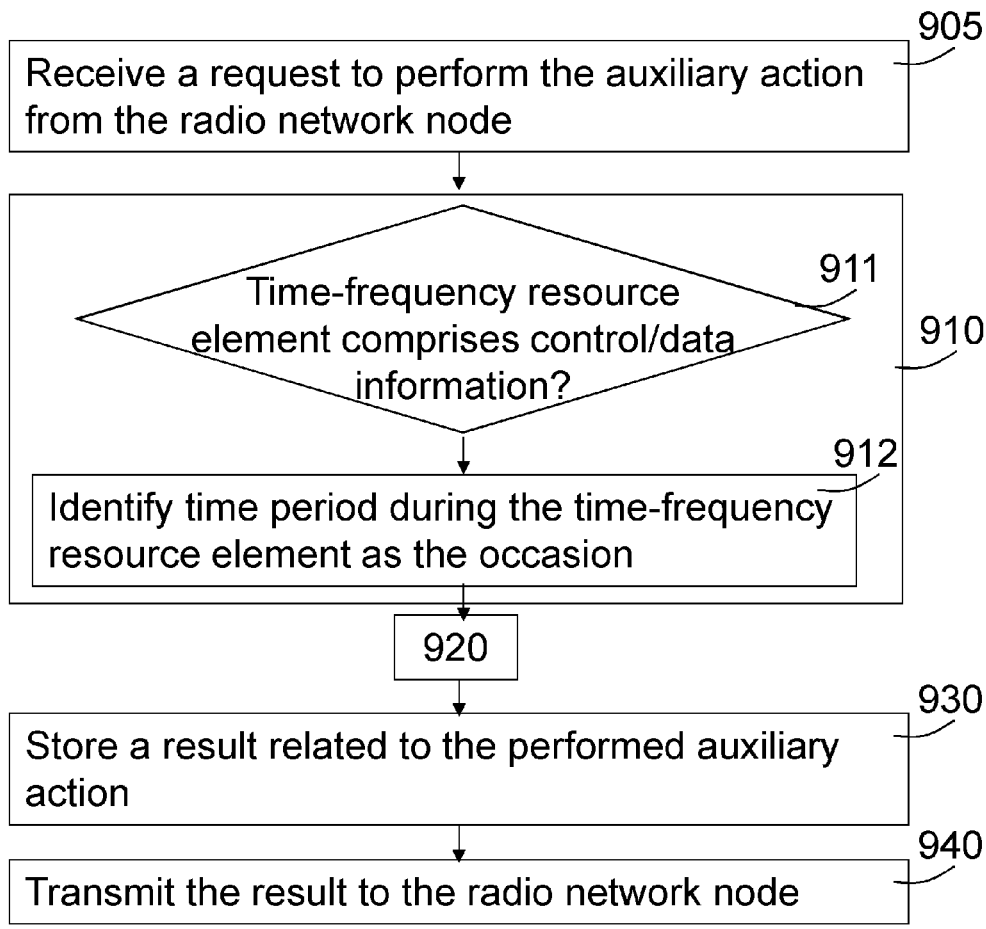

FIG. 9b is a flowchart illustrating a second embodiment of the method in the wireless device. In this embodiment, the step 910 of identifying the occasion comprises:
- 911: Monitoring to determine if the at least one time-frequency resource element comprises control and/or data information.
- 912: Identifying the time period of the at least one time-frequency resource element as the occasion, when it is determined that the at least one time-frequency resource element does not comprise control and/or data information.

The method further comprises the following:
- 905: An initial step of receiving a request to perform the auxiliary action from the radio network node. The request triggers the wireless device to identify interstitial occasions in order to perform the requested auxiliary actions.
- 930: Storing a result related to the performed auxiliary action. The result may comprise statistics associated with the performed auxiliary action. One example are statistics related to power saving in interstitial occasions.
- 940: Transmitting a result related to the performed auxiliary action to the radio network node. The result may also be transmitted to another wireless device, and via the radio network node to any other network node. The method may also comprise receiving a request from the radio network node to transmit the result to the radio network node.

In other embodiments of the invention, the step of identifying 910 the occasion may comprise one of the following:
1. Receiving information from the radio network node indicating that a low-interference subframe pattern is configured with a certain periodicity and over a certain time period. The occasion is identified based on the received information. The received information may comprise an indicator of the low-interference subframe.
2. Receiving an occasion pattern from the radio network node identifying the occasion.
3. Receiving an indication from a network node that the wireless device will not be scheduled in subframes other than subframes included in a configured scheduling pattern and/or in a measurement pattern. The time period of at least one time-frequency resource element, in a subframe other than the subframes included in the configured scheduling pattern and/or in the measurement pattern, is then identified as the occasion.
4. Identifying the occasion based on a pre-determined rule. The pre-determined rule may define at least one of the following: that a low-interference subframe will not be used for scheduling of data transmissions, that a part of the subframes of a low-interference subframe pattern will not be used for scheduling of data-transmissions, that only subframes in a restricted pattern configured for scheduling will be used for scheduling, that only certain subframes configured for scheduling will be used for scheduling, and that only subframes in a restricted measurement subframe pattern configured for measurement will be used for scheduling.

Figure 10A:
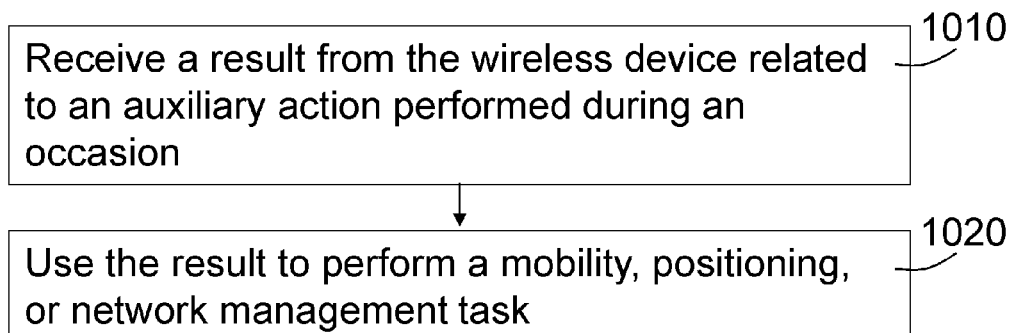
FIGS. 10a-b are flowcharts illustrating the method in a radio network node according to embodiments.

FIG. 10a is a flowchart illustrating a first embodiment of a method in a radio network node of a radio communication network using restricted measurement patterns and/or low-interference subframe patterns for inter-cell interference coordination. A low-interference subframe may be an ABS and a low-interference subframe pattern may thus be an ABS pattern. The method is suitable for supporting mobility, positioning, or network management. The radio network node is serving a wireless device. The method comprises:
- 1010: Receiving a result from the wireless device. The result is related to an auxiliary action performed by the wireless device during an occasion. The occasion comprises a time period during which at least one time-frequency resource element, in a subframe that is transmitted between the wireless device and the radio network node, does not comprise information intended for the wireless device, or is not a time-frequency resource element in which the wireless device is expected to transmit. The subframe is one of the following: a low-interference subframe comprised in a low-interference subframe pattern used by the radio network node; a subframe not comprised in a restricted measurement subframe pattern used by the radio network node; a subframe comprised in a random access response, RAR, window, which subframe does not overlap with a low-interference subframe comprised in a low-interference subframe pattern used by the radio network node. The subframe may be a downlink subframe or an uplink subframe.
- 1020: Using the result to perform a mobility, positioning, or network management task.

The auxiliary action may comprise at least one of: performing an inter-frequency and/or an inter-radio access technology measurement, performing a best-effort or a minimum-configuration measurement, turning off a receiver and/or a transmitter, processing received data, logging or performing measurements for non-urgent tasks, and performing low-power radio communication.

Figure 10B:
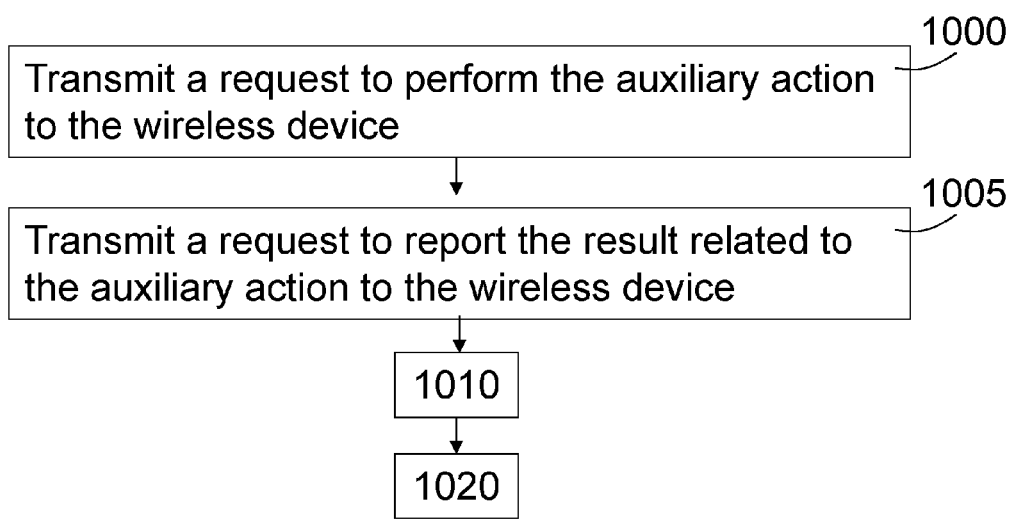

FIG. 10b is a flowchart illustrating a second embodiment of the method in the radio network node. In this embodiment, the method comprises the following initial steps in addition to steps 1010 and 1020 described above:
- 1000: Transmitting a request to the wireless device to perform the auxiliary action. This corresponds to step 905 described above.
- 1005: Transmitting a request to the wireless device to report the result related to the auxiliary action.

The step 1020 of using the result to perform a network management task may comprise forwarding the result to a network node involved in the network management task. The radio network node itself may not be the node best suited to perform the network management task, depending on what task it is. The network management task may comprise one or more of the following: monitoring of network performance; configuration of parameters related to network deployment; configuration of parameters related to interference coordination; load balancing among cells and carrier frequencies; admission control; network planning and deployment.

In embodiments of the invention, the method may comprise the following alternative steps in addition to the steps described in the previous embodiments, in order for the wireless device to be able to identify the occasion:
1. Transmitting information to the wireless device indicating that a low-interference subframe pattern is configured with a certain periodicity and over a certain time period.
2. Transmitting an occasion pattern to the wireless device.
3. Transmitting an indication to the wireless device that the wireless device will not be scheduled in subframes other than subframes included in a configured scheduling pattern and/or in a measurement pattern.

It is not mandatory that the radio network node receives a result related to the auxiliary action performed by the wireless device. The auxiliary action may e.g. be to turn off the receiver or transmitter of the wireless device and it may in this case not always be needed or wanted to keep track of the result, such as the battery savings in the wireless device. Therefore, in an alternative embodiment of the method in the radio network node, the method comprises only:

Transmitting a request to the wireless device to perform an auxiliary action during an occasion. The occasion comprises a time period during which at least one time-frequency resource element, in a subframe that is transmitted between the wireless device and the radio network node, does not comprise information intended for the wireless device, and/or is not a time-frequency resource element in which the wireless device is expected to transmit. The subframe is one of the following: a low-interference subframe comprised in a low-interference subframe pattern used by the radio network node; a subframe not comprised in a restricted measurement subframe pattern used by the radio network node; a subframe comprised in a random access response, RAR, window, which subframe does not overlap with a low-interference subframe comprised in a low-interference subframe pattern used by the radio network node.

The method may comprise the additional step of transmitting information associated with the occasion to the wireless device in order for the wireless device to identify the occasion as already described above.

The auxiliary action may as described above also in this case comprise at least one of: performing an inter-frequency and/or an inter-radio access technology measurement, performing a best-effort or a minimum-configuration measurement, turning off a receiver and/or a transmitter, processing received data, logging or performing measurements for non-urgent tasks, and performing low-power radio communication.

The method may also comprise transmitting a request to the wireless device to report a result related to the auxiliary action.

Figure 11:
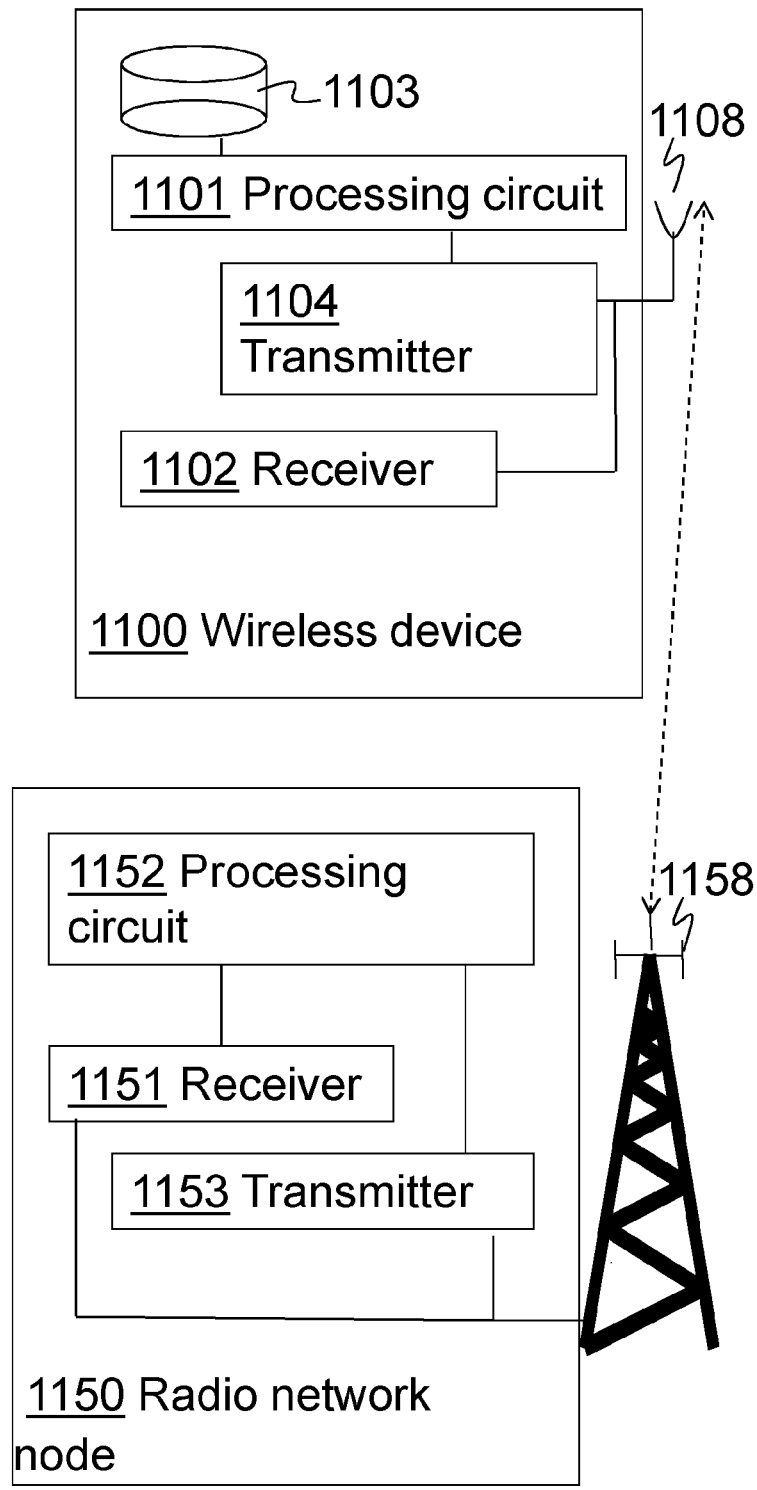
FIG. 11 is a block diagram schematically illustrating a wireless device and a radio network node according to embodiments.
Figure 12:
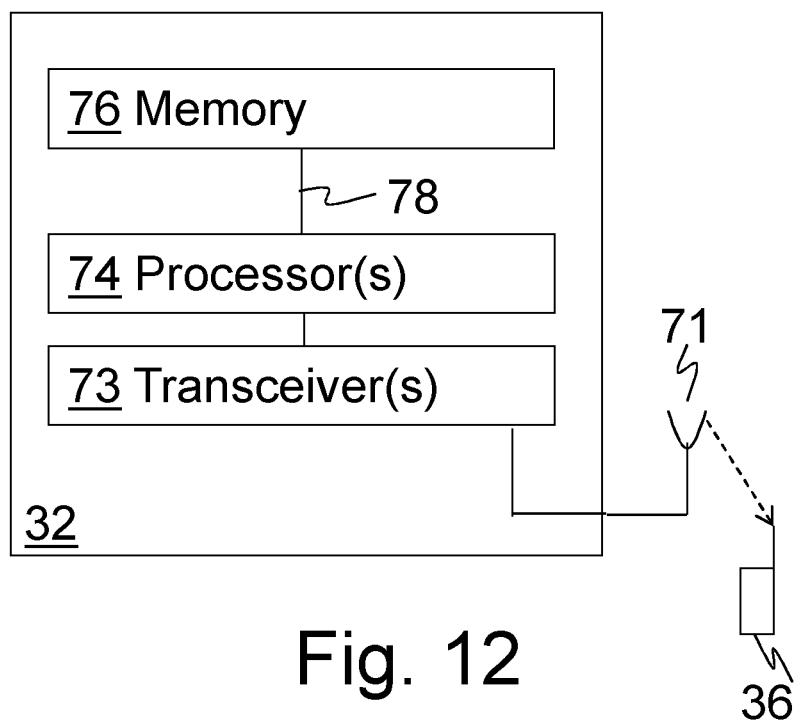
FIG. 12 is a block diagram schematically illustrating a generic node in which embodiments can be implemented.

An embodiment of a wireless device 1100 for improving wireless device performance and of a radio network node 1150 is schematically illustrated in the block diagram in FIG. 11. The wireless device 1100 is configured to be served by the radio network node 1150 of a radio communication network. The network is using restricted measurement patterns and/or low-interference subframe patterns such as ABS patterns for inter-cell interference coordination. The wireless device comprises a processing circuit 1101 configured to identify an occasion comprising a time period during which at least one time-frequency resource element, in a subframe that is transmitted between the wireless device and the radio network node, does not comprise information intended for the wireless device, or is not a time-frequency resource element in which the wireless device is expected to transmit. The subframe is at least one of the following: a low-interference subframe comprised in a low-interference subframe pattern used by the radio network node; a subframe not comprised in a restricted measurement subframe pattern used by the radio network node; a subframe comprised in a random access response, RAR, window, which subframe does not overlap with a low-interference subframe comprised in a low-interference subframe pattern used by the radio network node. The processing circuit is further configured to perform an auxiliary action during the identified occasion to improve the wireless device performance. The auxiliary action may comprise at least one of: performing an inter-frequency and/or an inter-radio access technology measurement, performing a best-effort or a minimum-configuration measurement, turning off a receiver and/or a transmitter, processing received data, logging or performing measurements for non-urgent tasks, and performing low-power radio communication.

In one embodiment of the wireless device, the processing circuit 1101 is configured to identify the occasion by monitoring to determine if the at least one time-frequency resource element comprises control and/or data information, and by identifying the time period of the at least one time-frequency resource element as the occasion, when it is determined that the at least one time-frequency resource element does not comprise control and/or data information.

In a further embodiment, the wireless device further comprises a receiver 1102 configured to receive information from the radio network node indicating that a low-interference subframe pattern is configured with a certain periodicity and over a certain time period. The receiver 1102 may be connected to one or more antennas 1108 via an antenna port. The processing circuit 1101 is configured to identify the occasion based on the received information. The received information may comprise an indicator of the low-interference subframe.

In another embodiment, the receiver 1102 is configured to receive an occasion pattern from the radio network node. The processing circuit 1101 may be configured to identify the occasion based on the received occasion pattern.

In still another embodiment, the receiver 1102 is configured to receive an indication from a network node that the wireless device will not be scheduled in subframes other than subframes included in a configured scheduling pattern and/or in a measurement pattern. The processing circuit 1101 may be configured to identify as the occasion the time period of at least one time-frequency resource element in a subframe other than the subframes included in the configured scheduling pattern and/or in the measurement pattern.

In one embodiment, the processing circuit 1101 is configured to identify the occasion based on a pre-determined rule. The pre-determined rule may define at least one of the following: that a low-interference subframe will not be used for scheduling of data transmissions, that a part of the subframes of a low-interference subframe pattern will not be used for scheduling of data-transmissions, that only subframes in a restricted pattern configured for scheduling will be used for scheduling, that only certain subframes configured for scheduling will be used for scheduling, and that only subframes in a restricted measurement subframe pattern configured for measurement will be used for scheduling.

In any of the above described embodiments of the wireless device 1100, the receiver 1102 may be configured to receive a request to perform the auxiliary action from the radio network node. The wireless device may also further comprise a database 1103. The processing circuit 1101 may be configured to store a result related to the performed auxiliary action in the database 1103. In one embodiment, the wireless device comprises a transmitter 1104 configured to transmit a result related to the performed auxiliary action to the radio network node or to another wireless device. The receiver 1102 may be configured to receive a request from the radio network node to transmit the result to the radio network node. The result may comprise statistics associated with the performed auxiliary action.

FIG. 11 also illustrates the radio network node 1150 of the radio communication network using restricted measurement patterns and/or low-interference subframe patterns for inter-cell interference coordination. The radio network node is configured to serve the wireless device 1100. The radio network node comprises a receiver 1151 configured to receive a result from the wireless device. The receiver may be connected to an antenna 1158 via an antenna port. The result is related to an auxiliary action performed by the wireless device during an occasion. The occasion comprises a time period during which at least one time-frequency resource element, in a subframe that is transmitted between the wireless device and the radio network node, does not comprise information intended for the wireless device, or is not a time-frequency resource element in which the wireless device is expected to transmit. The subframe is one of the following: a low-interference subframe comprised in a low-interference subframe pattern used by the radio network node; a subframe not comprised in a restricted measurement subframe pattern used by the radio network node; a subframe comprised in a random access response, RAR, window, which subframe does not overlap with a low-interference subframe comprised in a low-interference subframe pattern used by the radio network node. The subframe may be a downlink subframe or an uplink subframe. The radio network node further comprises a processing circuit 1152 configured to use the result to perform a mobility, positioning, or network management task.

The auxiliary action may comprise at least one of: performing an inter-frequency and/or an inter-radio access technology measurement, performing a best-effort or a minimum-configuration measurement, turning off a receiver and/or a transmitter, processing received data, logging or performing measurements for non-urgent tasks, and performing low-power radio communication.

In one embodiment, the radio network node further comprises a transmitter 1153 configured to transmit a request to the wireless device to perform the auxiliary action. The transmitter 1153 may also be configured to transmit a request to the wireless device to report the result related to the auxiliary action. Furthermore, the processing circuit 1152 may be configured to forward the result to a network node involved in the network management task. The network management task may comprise at least one of the following: monitoring of network performance; configuration of parameters related to network deployment; configuration of parameters related to interference coordination; load balancing among cells and carrier frequencies; admission control; network planning and deployment.

In alternative embodiments, the radio network node further comprises one of the following:

1. A transmitter 1153 configured to transmit information to the wireless device indicating that a low-interference subframe pattern is configured with a certain periodicity and over a certain time period, in order for the wireless device to identify the occasion.
2. A transmitter 1153 configured to transmit an occasion pattern to the wireless device in order for the wireless device to identify the occasion.
3. A transmitter 1153 configured to transmit an indication to the wireless device that the wireless device will not be scheduled in subframes other than subframes included in a configured scheduling pattern and/or in a measurement pattern, in order for the wireless device to identify the occasion.

In an alternative way to describe the embodiment of the wireless device in FIG. 11, the wireless device 1100 comprises a Central Processing Unit (CPU) which may be a single unit or a plurality of units. Furthermore, the wireless device 1100 comprises at least one computer program product (CPP) in the form of a non-volatile memory, e.g. an EEPROM (Electrically Erasable Programmable Read-Only Memory), a flash memory or a disk drive. The CPP comprises a computer program, which comprises code means which when run on the wireless device 1100 causes the CPU to perform steps of the procedure described earlier in conjunction with FIGS. 9*a*-*b*. In other words, when said code means are run on the CPU, they correspond to the processing circuit 1101 of FIG. 11. The processing circuit 1101, the transmitter 1104, the database 1103, and the receiver 1102, described above with reference to FIG. 11 may be logical units, separate physical units or a combination of both logical and physical units.

In an alternative way to describe the embodiment of the radio network node 1150 in FIG. 11, the radio network node comprises a Central Processing Unit (CPU) which may be a single unit or a plurality of units. Furthermore, the radio network node 1150 comprises at least one computer program product (CPP) in the form of a non-volatile memory, e.g. an EEPROM (Electrically Erasable Programmable Read-Only Memory), a flash memory or a disk drive. The CPP comprises a computer program, which comprises code means which when run on the radio network node 1150 causes the CPU to perform steps of the procedure described earlier in conjunction with FIGS. 10*a*-*b*. In other words, when said code means are run on the CPU, they correspond to the processing circuit 1152 of FIG. 11. The processing circuit 1152, the receiver 1151, and the transmitter 1153, described above with reference to FIG. 11 may be logical units, separate physical units or a combination of both logical and physical units.

An exemplary base station 32, 42, such as an eNodeB or a low power node, which can receive information associated with performance of auxiliary action(s), use such information, or support performance of auxiliary actions during interstitial occasions as described above, is generically illustrated in FIG. 12. Therein, the base station 32 includes one or more antennas 71 connected to processor(s) 74 via transceiver(s) 73. The processor 74 is configured to analyze and process signals received over an air interface from UEs 36, e.g., sounding reference signals, via the antennas 71 and transceiver 73, as well as to transmit signals towards the UEs 36. The processor(s) 74 may also be connected to one or more memory device(s) 76 via a bus 78. Further units or functions, not shown, for performing various operations as encoding, decoding, modulation, demodulation, encryption, scrambling, or precoding, may optionally be implemented not only as electrical components but also in software or a combination of these two possibilities, to enable the transceiver(s) 73 and processor(s) 74 to process uplink and downlink signals. A similar, generic structure, e.g., including a memory device, processor(s) and one or more transceivers, can be used, among other things, to other communication nodes, such as UEs 36, to perform auxiliary actions during interstitial occasions as described above.

The above-described embodiments are intended to be illustrative in all respects, rather than restrictive. All such variations and modifications are considered to be within the scope and spirit of the present invention. No element, act, or instruction used in the description of the present application should be construed as critical or essential unless explicitly described as such. Also, as used herein, the article "a" is intended to include one or more items.

The invention claimed is:

1. A method in a wireless device for improving wireless device performance, the wireless device being served by a radio network node of a radio communication network using restricted measurement patterns and/or low-interference subframe patterns for inter-cell interference coordination, the method comprising:
performing first inter-frequency or inter-RAT measurements during configured measurement gaps and governed by one or more defined measurement performance requirements, where RAT denotes "Radio Access Technology" and where each configured measurement gap represents a defined time period during which the wireless device is not expected to transmit or receive with respect to the radio network node;
identifying an interstitial occasion not in any of the configured measurement gaps and corresponding to a time period of at least one time-frequency resource element in a subframe that is transmitted between the wireless device and the radio network node, wherein the at least one time-frequency resource element does not comprise information intended for the wireless device, or is not a time-frequency resource element in which the wireless device is expected to transmit, and wherein the subframe is at least one of the following:
a low-interference subframe comprised in a low-interference subframe pattern used by the radio network node;
a subframe not comprised in a restricted measurement subframe pattern used by the radio network node;
a subframe comprised in a random access response, RAR, window, which subframe does not overlap with a low-interference subframe comprised in a low-interference subframe pattern used by the radio network node;
performing an auxiliary action during the identified interstitial occasion, said auxiliary action comprising performing second inter-frequency or inter-RAT measurements that are not governed by the defined performance measurement requirements; and
supplementing the first inter-frequency or inter-RAT measurements with the second inter-frequency or inter-RAT measurements, or otherwise reporting results of the second inter-frequency or inter-RAT measurements to the radio network node as additional measurement information.

2. The method according to claim 1, further comprising performing the auxiliary action responsive to receiving a request to perform the auxiliary action from the radio network node.

3. The method according to claim 1, wherein reporting the results of the second inter-frequency or inter-RAT measurements comprises reporting statistics associated with the second inter-frequency or inter-RAT measurements.

4. A wireless device for improving wireless device performance, wherein the wireless device is configured to be served by a radio network node of a radio communication network using restricted measurement patterns and/or low-interference subframe patterns for inter-cell interference coordination, the wireless device comprising:
a receiver configured to receive wireless communication signals;
a transmitter configured to transmit wireless communication signals;
a processing circuit operatively associated with the receiver and the transmitter and configured to:
perform first inter-frequency or inter-RAT measurements during configured measurement gaps and governed by one or more defined measurement performance requirements, where RAT denotes "Radio Access Technology" and where each configured measurement gap represents a defined time period during which the wireless device is not expected to transmit or receive with respect to the radio network node;
identify an interstitial occasion comprising a time period not in any of the configured measurement gaps and corresponding to a time period of at least one time-frequency resource element in a subframe that is transmitted between the wireless device and the radio network node, wherein the at least one time-frequency resource element does not comprise information intended for the wireless device, or is not a time-frequency resource element in which the wireless device is expected to transmit, and wherein the subframe is at least one of the following:
a low-interference subframe comprised in a low-interference subframe pattern used by the radio network node;
a subframe not comprised in a restricted measurement subframe pattern used by the radio network node;
a subframe comprised in a random access response, RAR, window, which subframe does not overlap with a low-interference subframe comprised in a low-interference subframe pattern used by the radio network node; and
perform an auxiliary action during the identified interstitial occasion, said auxiliary action comprising performing second inter-frequency or inter-RAT measurements that are not governed by the defined performance measurement requirements; and
supplement the first inter-frequency or inter-RAT measurements with the second inter-frequency or inter-RAT measurements, or otherwise report results of the second inter-frequency or inter-RAT measurements to the radio network node as additional measurement information.

5. The wireless device according to claim 4, wherein the processing circuitry is configured to perform the auxiliary action in response to receiving a request to perform the auxiliary action from the radio network node.

6. The method of claim 1, wherein supplementing the first inter-frequency or inter-RAT measurements with the second inter-frequency or inter-RAT measurements, or otherwise reporting the results of the second inter-frequency or inter-RAT measurements to the radio network node as additional measurement information, comprises reporting the results of the second inter-frequency or inter-RAT measurements as relative measurements with respect to the first inter-frequency or inter-RAT measurements.

7. The method of claim 1, wherein supplementing the first inter-frequency or inter-RAT measurements with the second inter-frequency or inter-RAT measurements, or otherwise reporting the results of the second inter-frequency or inter- RAT measurements to the radio network node as additional measurement information, comprises reporting the results of the second inter-frequency or inter-RAT measurements as Minimization of Drive Time (MDT) or Self Organizing Network (SON) measurements.

8. The method of claim 1, wherein supplementing the first inter-frequency or inter-RAT measurements with the second inter-frequency or inter-RAT measurements, or otherwise reporting the results of the second inter-frequency or inter-RAT measurements to the radio network node as additional measurement information, comprises speeding up completion of a given set of the first inter-frequency or inter-RAT measurements, based on using one or more of the second inter-frequency or inter-RAT measurements as additional measurements for inclusion in the given set of the first inter-frequency or inter-RAT measurements.

9. The wireless device of claim 4, wherein the processing circuitry is configured to report the results of the second inter-frequency or inter-RAT measurements to the radio network node as additional measurement information by reporting the results of the second inter-frequency or inter-RAT measurements as relative measurements with respect to the first inter-frequency or inter-RAT measurements.

10. The wireless device of claim 4, wherein the processing circuitry is configured to report the results of the second inter-frequency or inter-RAT measurements to the radio network node as additional measurement information by reporting the results of the second inter-frequency or inter-RAT measurements as Minimization of Drive Time (MDT) or Self Organizing Network (SON) measurements.

11. The wireless device of claim 4, wherein the processing circuitry is configured to supplement the first inter-frequency or inter-RAT measurements with the second inter-frequency or inter-RAT measurements by speeding up completion of a given set of the first inter-frequency or inter-RAT measurements, based on using one or more of the second inter-frequency or inter-RAT measurements as additional measurements for inclusion in the given set of the first inter-frequency or inter-RAT measurements.

* * * * *